(12) United States Patent
Matsunaga

(10) Patent No.: US 7,542,207 B2
(45) Date of Patent: Jun. 2, 2009

(54) ANTIGLARE AND ANTIREFLECTION FILM POLARIZING PLATE AND DISPLAY DEVICE

(75) Inventor: Naohiro Matsunaga, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 46 days.

(21) Appl. No.: 10/505,595

(22) PCT Filed: Feb. 24, 2003

(86) PCT No.: PCT/JP03/01989

§ 371 (c)(1),
(2), (4) Date: Aug. 25, 2004

(87) PCT Pub. No.: WO03/071316

PCT Pub. Date: Aug. 28, 2003

(65) Prior Publication Data

US 2005/0152034 A1 Jul. 14, 2005

(30) Foreign Application Priority Data

Feb. 25, 2002 (JP) .............................. 2002-048051
Feb. 25, 2002 (JP) .............................. 2002-048326

(51) Int. Cl.
*G02B 5/02* (2006.01)
(52) U.S. Cl. ........................ 359/599; 359/613; 359/601
(58) Field of Classification Search ................... 359/599
See application file for complete search history.

(56) References Cited

U.S. PATENT DOCUMENTS

| 5,886,819 | A | * | 3/1999 | Murata et al. | ............... 359/483 |
| 6,086,790 | A |   | 7/2000 | Hayashi et al. | |
| 6,217,176 | B1 | * | 4/2001 | Maekawa | ................... 359/601 |
| 6,343,865 | B1 | * | 2/2002 | Suzuki | ....................... 359/601 |
| 2001/0035929 | A1 |   | 11/2001 | Matsunaga et al. | |
| 2003/0112520 | A1 |   | 6/2003 | Takahashi et al. | |

FOREIGN PATENT DOCUMENTS

| JP | 06094904 A | * | 4/1994 |
| JP | 08 309910 |   | 11/1996 |
| JP | 10-039144 A |   | 2/1998 |
| JP | 11-038208 A |   | 2/1999 |
| JP | 11-183710 A |   | 7/1999 |
| JP | 11-281818 A |   | 10/1999 |

(Continued)

OTHER PUBLICATIONS

English translation of JP 06-094904 A.*

*Primary Examiner*—Arnel C Lavarias
(74) *Attorney, Agent, or Firm*—Buchanan Ingersoll & Rooney PC

(57) ABSTRACT

An antiglare and antireflection film having sufficiently high antireflection performance and at the same time, having excellent image display quality. An antiglare and antireflection film comprising a transparent support and at least one antiglare hard coat layer, wherein the at least one antiglare hard coat layer comprises a first light-transmissive particle having an average particle size of 60% to less than 95% based on the thickness of the antiglare hard coat layer, and a second light-transmissive particle having an average particle size of 105% to less than 140% based on the layer thickness.

18 Claims, 4 Drawing Sheets

FOREIGN PATENT DOCUMENTS

| | | |
|---|---|---|
| JP | 11-287902 A | 10/1999 |
| JP | 11-305010 A | 11/1999 |
| JP | 11 326608 | 11/1999 |
| JP | 2000-121809 A | 4/2000 |
| JP | 2000-180611 A | 6/2000 |
| JP | 2000-227508 A | 8/2000 |
| JP | 2000-227509 A | 8/2000 |
| JP | 2000 338310 | 12/2000 |
| JP | 2001-154006 A | 6/2001 |

\* cited by examiner

ANTIGLARE AND ANTIREFLECTION FILM POLARIZING PLATE AND DISPLAY DEVICE

TECHNICAL FIELD

The present invention relates to an antireflection film having antiglare property, and a polarizing plate and a display device using the same.

BACKGROUND ART

The antiglare and antireflection film has a function of reducing the reflectance using the scattering of light by surface protrusions and the thin film interference and in an image display device such as cathode ray tube display device (CRT), plasma display panel (PDP), electroluminescence display (ELD) and liquid crystal display device (LCD), this film is generally disposed on the outermost surface of a display so as to prevent the reduction of contrast due to reflection of external light, or prevent the entering by reflection of an image.

As for the design of surface shape of the antiglare layer, JP-A-8-309910 (the term "JP-A" as used herein means an "unexamined published Japanese patent application") discloses a technique for attaining both antiglare property and transmittance by setting the thickness of the antiglare hard coat layer to 50 to 90% of the average particle size of synthetic resin particles.

In recent years, techniques for improving the image display quality, such as wide view angle of liquid crystal display, rapid response and high refinement, are making a progress. One of the image display qualities is "good black without cloudiness in the black display when the power source is ON", namely, "how black the black can be displayed", and this is found to be very important for satisfying needs from users.

The antiglare techniques of using the surface scattering by surface protrusions for preventing the reduction in contrast due to reflection of external light or preventing the reflection of an image are accompanied by such problems that white blurring occurs or black is loosened. In using the antiglare and antireflection film, these problems must be solved.

Accordingly, in designing the antiglare layer, the surface shape must be designed to establish both antireflection and good black without cloudiness, but the above-described technique described in JP-A-8-309910 cannot satisfy this requirement.

In recent years, the demand for high refinement, namely, high image quality of a liquid crystal display is particularly very strong in addition to the wide view angle and rapid response. The high refinement can be realized by the formation of microsize liquid crystal cells, however, when the cell size becomes small, the surface protrusion of the antiglare and antireflection film acts as a fine lens and by a so-called "lens effect", the light transmitted through the antiglare and antireflection film and reached an eye of a user is dispersed in the brightness, namely, "glaring" is caused, as a result, the display quality is disadvantageously deteriorated.

To solve this problem, JP-A-11-95012, JP-A-11-305010, JP-A-11-326608, JP-A-2000-338310, JP-A-2001-154004, JP-A-2000-75133 and JP-A-2000-227509 disclose a method where a difference is given between the refractive index of an antiglare layer and the refractive index of a light-transmissive particle contained in the layer, so that the light passing through the antiglare layer is internally scattered and thereby, occurrence of glaring is prevented.

However, in the region of ultrahigh refinement, for example, of 133 ppi (133 pixels/inch), the simple method using internal scattering described in those patent publications encounters a new problem such as blurring of letters or mixing of colors due to use of internal scattering, though the glaring can be improved. Thus, both the improvement of glaring and the prevention of blurring of letters/mixing of colors cannot be attained at the same time.

DISCLOSURE OF THE INVENTION

An object of the present invention is to provide an antiglare and antireflection film having excellent image display qualities and capable of faithfully reproducing the black display, namely, attaining so-called good black without cloudiness, while having a sufficiently high antireflection performance.

An further object of the present invention is to provide an antiglare and antireflection film comprising a transparent support and at least one antiglare hard coat layer, where while maintaining sufficiently high antiglare and antireflection performance, both the improvement of glaring and the prevention of blurring of letters/mixing of colors are attained to ensure suitability for high refinement.

Another object of the present invention is to provide a polarizing plate and a display device each using this antiglare and antireflection film.

According to the present invention, the following antiglare and antireflection film, polarizing plate and display device are provided and by these, the above-described objects can be achieved.

(1) An antiglare and antireflection film comprising a transparent support and at least one antiglare hard coat layer, wherein the at least one antiglare hard coat layer comprises:

a first light-transmissive particle having an average particle size of 60% to less than 95% based on the thickness of said antiglare hard coat layer; and a second light-transmissive particle having an average particle size of 105% to less than 140% based on the thickness of said antiglare hard coat layer.

(2) The antiglare and antireflection film as described in (1), wherein the first light-transmissive particle has an average particle size of 70% to less than 95% based on the thickness of the antiglare hard coat layer, and the second light-transmissive particle has an average particle size of 105% to less than 130% based on the thickness of the antiglare hard coat layer.

(3) The antiglare and antireflection film as described in (1) and (2), wherein the first light-transmissive particle has an average particle size of 80% to less than 95% based on the thickness of the antiglare hard coat layer, and the second light-transmissive particle has an average particle size of 105% to less than 120% based on the thickness of the antiglare hard coat layer.

(4) The antiglare and antireflection film as described in (1) to (3), wherein the at least one antiglare hard coat layer has a thickness of 3 µm to less than 6 µm.

(5) The antiglare and antireflection film as described in (1) to (4), wherein the at least one antiglare hard coat layer has a thickness of 4 µm to less than 5 µm.

(6) The antiglare and antireflection film as described in (1) to (5), wherein the refractive index of the at least one antiglare hard coat layer and the refractive index of at least one light-transmissive particle in the antiglare hard coat layer are different in the range from 0.05 to 0.15.

(8) The antiglare and antireflection film as described in (1) to (7), wherein in the surface protrusion shape of the antiglare and antireflection film, the angle at a frequency of 95% as integrated from the small angle side in the inclination angle distribution is less than 15°.

(9) The antiglare and antireflection film as described in (1) to (8), wherein in the surface protrusion shape of the antiglare and antireflection film, the average distance (Sm) between protrusions is from 30 μm to less than 70 μm.

(10) The antiglare and antireflection film as described in (1) to (9), wherein in the surface protrusion shape of the antiglare and antireflection film, the average distance (Sm) between protrusions is from 40 μm to less than 60 μm.

(11) The antiglare and antireflection film as described in (1) to (11), wherein the transparent support is triacetyl cellulose.

(12) The antiglare and antireflection film as described in (1) to (11), which further comprises a low refractive index layer on the antiglare hard coat layer.

(13) The antiglare and antireflection film as described in (1) to (2), wherein the refractive index of the low refractive index layer is from 1.38 to 1.49.

(14) A polarizing plate which comprises a polarizer having two protective films, wherein one of the two protective films of the polarizer includes the antiglare and antireflection film described in any one of (1) to (13).

(15) The polarizing plate as described in (14), wherein in the two protective films of a polarizer in the polarizing film, the film other than the antiglare and antireflection film is an optical compensation film having an optical compensation layer comprising an optically anisotropic layer, the optically anisotropic layer is a layer having a negative birefringence and includes a compound having a discotic structural unit, the disc plane of the discotic structural unit is inclined with respect to the surface protective film plane, and the angle made by the disc plane of the discotic structural unit and the surface protective film plane is changed in the depth direction of the optically anisotropic layer.

(16) A circularly polarizing plate with an antireflection function, which comprises a λ/4 plate on the protective film in the side opposite the antiglare and antireflection film of the polarizing plate described in (14) or (15).

(17) The polarizing plate as described in any one of (14) to (16), wherein the polarizer of the polarizing plate is a polarizer produced by a method of stretching a continuously fed polymer film under application of a tension while holding both edges of the polymer film with holding means, in which the polymer film is stretched to 1.1 to 20.0 times at least in the cross direction of the film, the difference in the running speed in the longitudinal direction between holding units at both edges of the film is 3% or less, and the film travelling direction is bent while keeping the state of holding both edges of the film so that the angle made by the film travelling direction and the substantial stretching direction of the film at the outlet of the step of holding both edges of the film can be inclined at 20 to 70°.

(18) A display device comprising the antiglare and antireflection film described in any one of (1) to (13) for the outermost surface of the display.

(19) A display device comprising the polarizing plate with an antiglare and antireflection film described in (14) to (17) for the outermost surface of the display.

(20) The display device as described in (18) or (19), which is a TN-, STN-, VA-, IPS- or OCB-mode transmissive, reflective or transflective liquid crystal having at least one polarizing plate.

(21) The display device as described in (18) or (19), which is a transmissive or transflective liquid crystal display device having at least one polarizing plate, wherein a polarization separation film having a polarization selective layer is disposed between the backlight and the polarizing plate in the side opposite the viewing side.

(22) The antiglare and antireflection film as described in any one of (1) to (13), wherein when light enters from the transparent support side, the ratio between the quantity ($I_5°$) of light scattered to the direction inclined at 5° in the transmitted light and the quantity ($I_0°$) of light proceeded straight in the transmitted light is 3.5% or more, and the ratio between the quantity ($I_0°$) of light scattered to the direction inclined at 20° in the transmitted light and the quantity ($I_0°$) of light proceeded straight in the transmitted light is 0.1% or less.

(23) The antiglare and antireflection film as described in (22), wherein a low refractive index layer having a refractive index of 1.38 to 1.49 is provided on the antiglare hard coat layer.

(24) The antiglare and antireflection film as described in (22) or (23), wherein the refractive index of at least one antiglare hard coat layer and the refractive index of a light-transmissive particle contained therein are different in the range from 0.05 to 0.15.

(25) The antiglare and antireflection film as described in any one of (22) to (24), wherein the transparent support is triacetyl cellulose.

(26) A polarizing plate which comprises a polarizer having two protective films, wherein one of the two protective films of the polarizer includes the antiglare and antireflection film described in any one of (22) to (25).

(27) The polarizing plate as described in (26), wherein in the two protective films of a polarizing film in the polarizing film, the film other than the antireflection film or the antiglare and antireflection film is an optical compensation film having an optical compensation layer comprising an optically anisotropic layer, the optically anisotropic layer is a layer having a negative birefringence and includes a compound having a discotic structural unit, the disc plane of the discotic structural unit is inclined with respect to the surface protective film plane, and the angle made by the disc plane of the discotic structural unit and the surface protective film plane is changed in the depth direction of the optically anisotropic layer.

(28) A circularly polarizing plate with an antireflection function, which comprises a λ/4 plate on the protective film in the side opposite the antiglare and antireflection film of the polarizing plate described in (26) or (27).

(29) The polarizing plate as described in any one of (26) to (28), wherein the polarizing film of the polarizing plate is a polarizing film produced by a method of stretching a continuously fed polymer film under application of a tension while holding both edges of the polymer film with holding means, in which the polymer film is stretched to 1.1 to 20.0 times at least in the cross direction of the film, the difference in the running speed in the longitudinal direction between holding units at both edges of the film is 3% or less, and the film travelling direction is bent while keeping the state of holding both edges of the film so that the angle made by the film travelling direction and the substantial stretching direction of the film at the outlet of the step of holding both edges of the film can be inclined at 20 to 70°.

(30) A display device comprising the antiglare and antireflection film described in any one of (22) to (25), or the polarizing plate with an antiglare and antireflection film described in any one of (26) to (29) for the outermost surface of the display.

(31) A TN-, STN-, VA-, IPS- or OCB-mode transmissive, reflective or transflective display device having at least one polarizing plate described in (26) to (29).

(32) A display device, which is a transmissive or transflective liquid crystal display device having at least one polarizing plate described in (26) to (29), wherein a polarization separation film having a polarization selective group is disposed between the backlight and the polarizing plate in the side opposite the viewing side.

Figure 1:
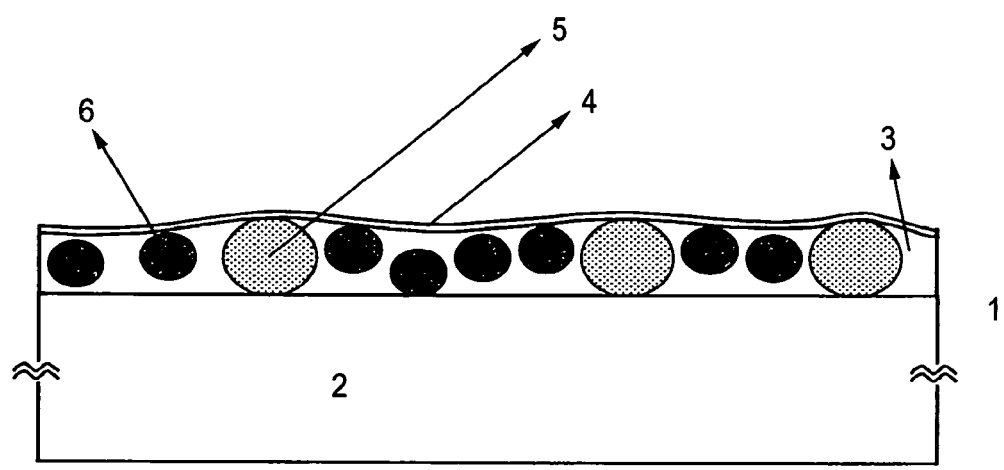
FIG. 1 is a schematic cross-sectional view showing the layer structure of an antiglare and antireflection film.

DESCRIPTION OF SYMBOLIC REFERENCES 1 antiglare and antireflection film
2 transparent support
3 antiglare hard coat layer
4 refractive index layer
5 particle of imparting antiglare property
6 particle of imparting internal scattering property
(i) direction of introducing film
(ii) direction of conveying film to next step
(a) step of introducing film
(b) step of stretching film
(c) step of delivering stretched film to next step
A1 position of engaging film with holding means and position of starting stretching film (substantial holding start point: right)
B1 position of engaging film with holding means (left)
C1 position of starting stretching film (substantial holding start point: left)
Cx position of releasing film and final basis position of film stretching (substantial holding release point: left)
Ay final basis position of film stretching (substantial holding release point: right)
|L1−L2| difference in pathway between right and left film holding means
W substantial width at the end of film stretching step
θ angle made by stretching direction and film-travelling direction
11 center line of film in the introduction side
12 center line of film delivered to next step
13 trajectory of film holding means (left)
14 trajectory of film holding means (right)
15 film in the introduction side
16 film delivered to next step
17, 17' left and right points of starting holding (engaging) film
18, 18' left and right points of releasing film from holding means
21 center line of film in the introduction side
22 center line of film delivered to next step
23 trajectory of film holding means (left)
24 trajectory of film holding means (right)
25 film in the introduction side
26 film delivered to next step
27, 27' left and right points of starting holding (engaging) film
28, 28' left and right points of releasing film from holding means 81 absorption axis of polarizing plate
82 longitudinal direction

BEST MODES OF CARRYING OUT THE INVENTION

The basic construction of the antiglare and antireflection film preferred as one practical embodiment of the present invention is described below by referring to the drawings.

The embodiment schematically shown in FIG. 1 is one example of the antiglare and antireflection film of the present invention. In this case, the antiglare and antireflection film 1 has a layer structure in the order of a transparent support 2, an antiglare hard coat layer 3 and a low refractive index layer 4. In the antiglare hard coat layer 3, antiglare property-imparting particles 5 which are a light-transmissive particle, or additionally, internal scattering-imparting particles 6 which are a light-transmissive particle, are dispersed.

In the antiglare hard coat layer 3, the portion other than the light-transmissive particles 5 and 6 preferably has a refractive index of 1.48 to 1.70. The refractive index of the low refractive index layer is preferably from 1.38 to 1.49.

The antiglare and antireflection film of the present invention has at least one antiglare hard coat layer on a transparent support. If desired, a low refractive index layer may be provided as an upper layer of the antiglare hard coat layer to decrease the reflectance and also, if desired, a smooth hard coat layer may be provided as a lower layer of the antiglare hard coat layer to increase the film strength.

The antiglare hard coat layer of the present invention is described below.

The antiglare hard coat layer is formed from a binder for imparting hard coat property, a light-transmissive particle for imparting antiglare property or internal scattering property, and an inorganic fine particle filler for elevating the refractive index, preventing the crosslinking shrinkage or increasing the strength.

The antiglare hard coat layer of the present invention must contain at least two or more kinds of light-transmissive fine particles different in the particle size. The construction material for these particles is not limited and the species thereof may be the same or different as long as the requirements of the present invention are satisfied. The present inventors have made extensive investigations to attain both the antireflection performance and the good black without cloudiness. As a result, out of at least two kinds of light-transmissive particles, the average particle size of the first light-transmissive particle is from 60% to less than 95%, preferably from 70% to less than 95%, more preferably from 80% to less than 95%. The average particle size of the second light-transmissive particle is from 105% to less than 140%, preferably from 105% to less than 130%, more preferably from 105% to less than 120%. In either case where the average particle size of the first light-transmissive particle is less than 60% or where the average particle size of the second light-transmissive particle is 140% or more, the performance of the present invention (establishment of both antireflection performance and good black without cloudiness) cannot be realized. Also, if each average particle size of at least two kinds of particles is in the range from 95% to less than 105% based on the thickness of the antiglare hard coat layer, the performance of the present invention cannot be realized.

The thickness of the antiglare hard coat layer of the present invention is preferably from 3 μm to less than 6 μm, more preferably from 4 μm to less than 5 μm. If the thickness of the antiglare layer is less than 3 μm, the press scratch resistance (pencil hardness) may decrease, whereas if it exceeds 6 μm, the fragility or coatability (the viscosity of the coating solution increases and the coating becomes difficult) may be worsened. In the case where the antiglare hard coat layer is required to have at the same time suitability for high refinement (even in a high refinement liquid crystal display, glaring due to the lens effect by the surface protrusions of the antiglare layer does not occur), also in view of the suitable range (described later) for the particle size of the light-transmissive particle necessary therefor, the thickness of the antiglare layer is preferably in the above-described range. The thickness of the antiglare hard coat layer is examined by a sectional TEM (transmission electron microscope). The thickness of the antiglare hard coat layer is defined as a vertical distance in the antiglare hard coat layer based on the thinnest portion having no light-transmissive fine particle, from the portion of the component as the lower layer of the antiglare hard coat layer (in the case of having no lower layer, the support component), which is positioned closest to the antiglare hard coat layer.

The antiglare hard coat layer contains a light-transmissive particle, for example, an inorganic compound particle or an organic polymer (resin) particle. The refractive index of the light-transmissive fine particle is preferably from 1.40 to 1.80, though this must be selected by taking account of the relationship with the refractive index of the antiglare hard coat layer in the portion other than the light-transmissive particle. Specific preferred examples of the light-transmissive particle include inorganic compound particles such as silica particle (for example, SEAHOSTA series produced by Nippon Shokubai Co., Ltd., refractive index: 1.43), alumina particle (for example, SUMICORANDOM series produced by Sumitomo Chemical Co., Ltd., refractive index: 1.64) and $TiO_2$ particle, and resin particles such as crosslinked acrylic particle (for example, MX series produced by Soken Kagaku K.K., refractive index: 1.49), crosslinked styrene particle (for example, SX series produced by Soken Kagaku, refractive index: 1.61), crosslinked melamine particle and crosslinked benzoguanamine particle (for example, EPOSTAR series produced by Nippon Shokubai Co., Ltd., refractive index: 1.68). Among these, crosslinked styrene particle is more preferred. The light-transmissive particle may have a spherical or amorphous form but a spherical particle is preferred because the surface protrusions can be uniform in the shape.

Insofar as these light-transmissive particles are different in the particle size as described above, the species of the construction material therefor is not limited and two or more kinds of construction materials may be used or the construction material may be the same. The light-transmissive particle is incorporated into the antiglare hard coat layer such that the content in the antiglare hard coat layer formed becomes preferably from 100 to 1,000 mg/m$^2$, more preferably from 300 to 800 mg/m$^2$.

Out of the light-transmissive particles, the particle of imparting the antiglare property is preferably a particle having a particle size larger than the thickness of the antiglare layer, because this is efficient. The particle having a refractive index different from the refractive index of the antiglare layer and contributing to the internal scattering may be the particle of imparting the antiglare property or may be a particle of not imparting the antiglare property and being embedded in the layer. In this case, the particle preferably has a particle size smaller than the thickness of the antiglare layer so as not to excessively intensify the antiglare property. The particle size range is described above.

In the antiglare hard coat layer of the present invention, when light enters from the transparent support side, the ratio $I_5°/I_0°$ between the quantity ($I_5°$) of light transmitted and scattered to the direction inclined at 5° and the quantity ($I_0°$) of light transmitted and proceeded straight is preferably 3.5% or more, more preferably 4.0% or more. The upper limit is preferably 20% or less, more preferably 10% or less, still more preferably 6% or less. If this ratio is overlarge, despite good effect as for glaring, the front brightness decreases and the display image is disadvantageously darkened. Also, when light enters from the transparent support side, the ratio $I_{20}°/I_0°$ between the quantity ($I_{20}°$) of light transmitted and scattered to the direction inclined at 20° and the quantity ($I_0°$) of light transmitted and proceeded straight is preferably 0.15% or less, more preferably 0.10% or less, still more preferably 0.08% or less, particularly preferably 0.06% or less. The lower limit is preferably 0%. If $I_5°/I_0°$ is less than 3.5%, the improvement of glaring is insufficient and if $I_{20}°/I_0°$ exceeds 0.15%, blurring of image arises as a problem. These physical properties are related with the surface shape of antiglare and antireflection film and the internal scattering property. The former is decided by (1) the thickness of the antiglare layer, (2) the particle size and amount used of the light-transmissive fine particle (particularly the particle of imparting antiglare property) and (3) the solvent composition/coating and drying conditions of the coating solution. The latter is decided by (1) the particle size and amount used of the light-transmissive fine particle (particle of imparting internal scattering property) and (2) the ratio between the refractive index of the antiglare layer and the refractive index of the light-transmissive fine particle. Each control factor is described below.

The binder is preferably a polymer having a saturated hydrocarbon chain or a polyether chain as the main chain, more preferably a polymer having a saturated hydrocarbon chain as the main chain.

The binder polymer also preferably has a crosslinked structure.

The binder polymer having a saturated hydrocarbon chain as the main chain is preferably a polymer of an ethylenically unsaturated monomer. The binder polymer having a saturated hydrocarbon chain as the main chain and having a crosslinked structure is preferably a (co)polymer of a monomer having two or more ethylenically unsaturated groups.

In order to have a high refractive index, the monomer preferably contains in the structure thereof an aromatic ring or at least one atom selected from the group consisting of halogen atoms (exclusive of fluorine), a sulfur atom, a phosphorus atom and a nitrogen atom.

Examples of the monomer having two or more ethylenically unsaturated groups include esters of polyhydric alcohol and (meth)acrylic acid (e.g., ethylene glycol di(meth)acrylate 1,4-dichlorohexane diacrylate, pentaerythritol tetra(meth)acrylate, pentaerythritol tri (meth) acrylate, trimethylolpropane tri(meth)acrylate, trimethylolethane tri(meth)acrylate, dipentaerythritol tetra(meth)acrylate, dipentaerythritol penta (meth)acrylate, dipentaerythritol hexa(meth)acrylate, 1,2,3-cyclohexane tetramethacrylate, polyurethane polyacrylate, polyester polyacrylate), vinylbenzenes and derivatives thereof (e.g., 1,4-divinylbenzene, 4-vinylbenzoic acid-2-acryloylethyl ester, 1,4-divinylcyclohexanone), vinylsulfones (e.g., divinylsulfone), acrylamides (e.g., methylenebisacrylamide) and methacrylamides. These monomers may be used in combination of two or more thereof.

Specific examples of the high refractive index monomer include bis(4-methacryloylthiophenyl)sulfide, vinylnaphthalene, vinylphenylsulfide and 4-methacryloxyphenyl-4'-methoxyphenylthioether. These monomers may also be used in combination of two or more thereof.

The polymerization of the monomer having such ethylenically unsaturated groups may be performed under irradiation of ionizing radiation or under heat in the presence of a photo-radical polymerization initiator or a heat-radical polymerization initiator.

Accordingly, the antiglare and antireflection film can be formed by preparing a coating solution containing a monomer having ethylenically unsaturated groups, a photo- or heat-radical polymerization initiator, a matting particle and an inorganic filler, applying the coating solution to a transparent support, and curing the coating solution through a polymerization reaction under ionizing radiation or heat.

Examples of the photo-radical polymerization initiator include acetophenones, benzophenones, Michler's benzoyl benzoate, amyloxime esters, tetramethylthiuram monosulfides and thioxanthones.

In particular, photocleavable photo-radical polymerization initiators are preferred. The photocleavable photo-radical initiator is described in *Saishin UV Koka Gijutsu* (*Newest UV Curing Technology*), page 159, Kazuhiro Takausu (publisher), issued by Gijutsu Joho Kyokai (1991).

Examples of the commercially available photocleavable photo-radical polymerization initiator include Irgacure (651, 184 and 907) produced by Nippon Ciba Geigy.

The photo-radical polymerization initiator is preferably used in an amount of 0.1 to 15 parts by mass, more preferably from 1 to 10 parts by mass, per 100 parts by mass of the polyfunctional monomer.

In addition to the photopolymerization initiator, a photo-sensitizer may be used. Specific examples of the photosensitizer include n-butylamine, triethylamine, tri-n-butylphosphine, Michler's ketone and thioxanthone.

The polymer having a polyether as the main chain is preferably a ring-opening polymer of a polyfunctional epoxy compound. The ring-opening polymerization of a poly-functional epoxy compound can be performed under irradiation of ionizing radiation or under heat in the presence of a photoacid generator or a heat-acid generator.

Accordingly, the antiglare and antireflection film can be formed by preparing a coating solution containing a polyfunctional epoxy compound, a photoacid generator or heat-acid generator, a matting particle and an inorganic filler, applying the coating solution to a transparent support and curing the coating solution through a polymerization reaction under ionizing radiation or heat.

In place of or in addition to the monomer having two or more ethylenically unsaturated groups, a monomer having a crosslinkable functional group may be used so as to introduce the crosslinkable functional group into the polymer and by the reaction of this crosslinkable functional group, a crosslinked structure can be introduced into the binder polymer.

Examples of the crosslinkable functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester, a urethane or a metal oxide such as tetramethoxysilane can be used as a monomer for introducing a crosslinked structure. A functional group which exhibits crosslinking property as a result of the decomposition reaction, such as block isocyanate group, may also be used. In other words, the crosslinkable functional group for use in the present invention may be a group which does not directly cause a reaction but exhibits reactivity after the decomposition.

The binder polymer having this crosslinkable functional group is coated and then heated, whereby a crosslinked structure can be formed.

In order to increase the refractive index of the antiglare layer, the antiglare hard coat layer preferably contains an inorganic filler comprising an oxide of at least one metal selected from the group consisting of silicon, titanium, zirconium, aluminum, indium, zinc, tin and antimony and having an average particle size of 0.2 μm or less, preferably 0.1 μm or less, more preferably 0.06 μm or less, in addition to the above-described light-transmissive particle. The shape of the inorganic filler is not particularly limited and, for example, a spherical form, a plate form, a fiber form, a bar form, an amorphous form and a hollow form all can be preferably used but a spherical form is more preferred because good dispersibility can be obtained. Depending on the amount filled, this inorganic filler can contribute to the prevention of curling and the improvement of surface hardness. In the case where the antiglare layer contains the inorganic filler, the refractive index of the antiglare layer is determined by each refractive index of the transparent resin and inorganic filler constituting the antiglare layer and the mixing ratio thereof.

The difference between the refractive index of the antiglare layer and the refractive index of the internal scattering particle out of the above-described light-transmissive particles is preferably from 0.05 to 0.15. If the difference is less than 0.05, the internal scattering property becomes low and a large volume of internal scattering particle must be contained, which may disadvantageously cause reduction in the strength of the antiglare antireflection film. On the other hand, if it exceeds 0.15, the scattering angle of the scattered light becomes large to cause blurring of letters and this is not preferred. The difference in the refractive index is most preferably from 0.07 to 0.13. Which is large or small the refractive index of the antiglare hard coat layer and the refractive index of the light-transmissive particle is not particularly limited. In order to more reduce the blurring of letters, the refractive index of the antiglare hard coat layer is preferably lower than the refractive index of the light-transmissive particle within the above-described range of the difference in the refractive index, however, in order to more reduce the reflectance as the antiglare and antireflection film, the refractive index of the antiglare hard coat layer is preferably higher than the refractive index of the light-transmissive particle. This is appropriately selected according to the concept of design.

Specific examples of the inorganic filler for use in the antiglare hard coat layer include $TiO_2$, $ZrO_2$, $Al_2O_3$, $In_2O_3$, $ZnO$, $SnO_2$, $Sb_2O_3$, ITO and $SiO_2$. Among these inorganic fillers, $SiO_2$, $TiO_2$ and $ZrO_2$ are preferred in view of handleability. The surface of the inorganic filler is preferably subjected to a silane coupling treatment or a titanium coupling treatment. A surface treating agent having a functional group capable of reacting the binder species on the filler surface is preferably used.

The amount of the inorganic filler added is preferably from 10 to 90%, more preferably from 20 to 70%, still more preferably from 30 to 50%, based on the entire mass of the antiglare hard coat layer.

This inorganic filler has a particle size sufficiently smaller than the wavelength of light and causes no scattering and as described above, a composite material comprising a resin binder having dispersed therein the filler behaves as an optically uniform substance.

The antiglare hard coat layer of the present invention comprising a resin binder or comprising a resin binder containing an inorganic filler preferably has a refractive index of 1.48 to 1.70, more preferably from 1.48 to 1.65.

The refractive index in this range can be obtained by appropriately selecting the kind and amount ratio of the resin binder and the inorganic filler. The kind and amount ratio to be selected can be easily known by a preliminary experiment.

The control factor for the surface protrusion shape of the antiglare and antireflection film of the present invention includes (1) the construction material species, particle size and amount added of the light-transmissive particle for imparting antiglare property or internal scattering, (2) the thickness of the antiglare layer comprising a resin or a composite material of a resin and an inorganic filler, (3) the solvent composition of the coating solution, (4) the wet coated amount, (5) the drying conditions and (6) the curing conditions for the ionizing radiation-curable resin. Among these, (1) and (2) have a large effect. The present inventors have studied thereon, as a result, it has been found that even if the antiglare and antireflection film gives the same antiglare performance, when individual surface protrusions have different shapes, the good black without cloudiness (in other words, white tinge) in the appearance differs due to difference of the surface scattering at the OFF time of the power source of a display or at the black display time of a liquid crystal display. If the protrusion inclination angle of the surface protrusion is large, the surface scattering to the wide angle region is intensified, as a result, the non-loosening is impaired to give a whitish display and the high-grade feeling is lost. It is clarified in extensive studies that the good black without cloudiness is closely correlated with the angle at a frequency of 95% from the small angle side in the protrusion inclination angle distribution and this angle is preferably less than 20°, more preferably less than 15°, still more preferably less than 13°. The lower limit is preferably about 0.1°. Furthermore, the average surface protrusion inclination angle which is closely correlated to the antiglare property is preferably from 1 to 5°, more preferably from 1.5 to 4.5°, still more preferably from 2 to 4°.

In the surface protrusion shape of the antiglare and antireflection film of the present invention, the average distance (Sm) between protrusions is also important and in order not to impair the good black without cloudiness, the average distance is from 30 μm to less than 70 μm, preferably from 40 μm to less than 60 μm. If this average distance is less than 30 μm, the existence probability of the protrusion part contributing to the surface scattering becomes excessively high to give a whitish display and this contradicts the object of the present invention to attain good black without cloudiness. On the other hand, if the average distance is 70 μm or more, the existence probability of the protrusion part shown in the smooth part becomes small, as a result, so-called "roughness feeling" is given to users and this is not preferred in view of the display quality.

In the present invention, in order to ensure an antiglare hard coat layer having a uniform surface state free of coating unevenness, drying unevenness, dot defect and the like, the coating composition for the antiglare hard coat layer may contain either a fluorine-containing surfactant or a silicone-containing surfactant or both of them. Particularly, a fluorine-containing surfactant is preferably used because it exerts an effect of improving the surface state failures of the antiglare and antireflection film of the present invention, such as coating unevenness, drying unevenness and dot defect, with a smaller amount added.

Preferred examples of the fluorine-containing surfactant include perfluoroalkylsulfonic acid amide group-containing nonionic surfactants such as Florad FC-431 produced by 3M and perfluoroalkyl group-containing oligomers such as Megafac F-171, F-172, F-173 and F-176 PF produced by Dainippon Ink & Chemicals, Inc. Examples of the silicone-containing surfactant include polydimethyl-siloxanes where the terminal of side chain or main chain is modified with various substituents such as oligomer (e.g., ethylene glycol, propylene glycol).

However, on use of such a surfactant, a functional group containing F atom and/or a functional group having an Si atom segregates on the antiglare layer surface, as a result, the surface energy of the antiglare layer decreases and there may arise a problem that the antireflection performance is worsened when a low refractive index layer is overcoated on the antiglare layer. This is presumed to occur because the coating composition used for the formation of the low refractive index layer is deteriorated in the wettability and fine unevenness undetectable with an eye is caused in the thickness of the low refractive index layer. As a result of studies, it is found effective for solving this problem to control the surface energy of the antiglare layer to from 25 to 70 mN·m$^{-1}$, more preferably from 35 to 70 mN·m$^{-1}$, by adjusting the structure and amount added of the fluorine-containing and/or silicon-containing surfactant and also, as described later, to use a coating solution for the low refractive index layer where 50 to 100 mass % of the coating solvent is occupied by a solvent having a boiling point of 100° C. or less. It is also known that in order to realize the above-described surface energy, the ratio F/C of the peak derived from the F atom and the peak derived from the C atom measured by an X-ray photoelectric spectrometry must be 0.40 or less and/or the ratio Si/C of the peak derived from the Si atom and the peak derived from the C must be 0.30 or less.

In the antiglare and antireflection film of the present invention, a smooth hard coat layer having no antiglare property is also preferably used to improve the film strength and this layer is provided between the transparent support and the antiglare hard coat layer.

The construction materials for use in the smooth hard coat layer are the same as those described in the antiglare hard coat layer except that a light-transmissive particle for imparting antiglare property is not used. The smooth hard coat layer is formed from a resin binder or a mixture of a resin binder and an inorganic filler.

The inorganic filler for use in the smooth hard coat layer of the present invention is preferably silica or alumina in view of the strength and the general use property. In particular, silica is preferred. The surface of the inorganic filler is preferably subjected to a silane coupling treatment and a surface treating agent having a functional group capable of reacting with the binder species on the filler surface is preferably used.

The amount of the inorganic filler added is preferably from 10 to 90%, more preferably from 20 to 70%, still more preferably from 30 to 50%, based on the total mass of the hard coat layer. The thickness of the smooth hard coat layer is preferably from 1 to 10 μm, more preferably from 2 to 7 μm, still more preferably from 3 to 5 μm.

The low refractive index layer for use in the present invention is described below.

The low refractive index layer of the antiglare and antireflection film of the present invention has a refractive index of 1.38 to 1.49, preferably from 1.38 to 1.44.

Furthermore, from the standpoint of obtaining low reflectance, the low refractive index layer preferably satisfies the following equation (I):

$$m\lambda/4 \times 0.7 < n_1 d_1 < m\lambda/4 \times 1.3 \tag{I}$$

wherein m represents a positive odd number, $n_1$ represents a refractive index of the low refractive index layer, $d_1$ represents a thickness (nm) of the low refractive index layer, and λ represents a wavelength in the range from 500 to 550 nm.

To satisfy equation (I) means that m (positive odd number, usually 1) satisfying equation (I) is present in the above-described wavelength range.

The construction materials for forming the low refractive index layer of the present invention are described below.

The low refractive index binder for use in the low refractive index layer is preferably a fluorine-containing compound having a kinetic friction coefficient of 0.03 to 0.15 and a contact angle to water of 90 to 120° and capable of crosslinking by heat or ionizing radiation.

Examples of the crosslinkable fluorine-containing polymer for use in the low refractive index layer include perfluoroalkyl group-containing silane compounds (e.g., (heptadecafluoro-1,1,2,2-tetradecyl)triethoxysilane) and fluorine-containing copolymers using, as the constituent units, a fluorine-containing monomer and a monomer for imparting a crosslinkable group.

Specific examples of the fluorine-containing monomer unit include fluoroolefins (e.g., fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (e.g., BISCOTE 6FM (produced by Osaka Yuki Kagaku), M-2020 (produced by Daikin)), and completely or partially fluorinated vinyl ethers.

Examples of the monomer for imparting a crosslinkable group include (meth)acrylate monomers previously having a crosslinkable functional group within the molecule, such as glycidyl methacrylate, and (meth)acrylate monomers having a carboxyl group, a hydroxyl group, an amino group or a sulfonic acid group, such as (meth)acrylic acid, methylol (meth)acrylate, hydroxyalkyl (meth)acrylate and allyl acrylate. In the latter case, a crosslinked structure can be introduced after the copolymerization and this is disclosed in JP-A-10-25388 and JP-A-10-147739.

Not only the polymer using the above-described fluorine-containing monomer as the constituent unit but also a copolymer with a monomer not containing a fluorine atom may be used. The monomer unit which can be used in combination is not particularly limited and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methyl vinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives.

The inorganic filler for use in the low refractive index layer preferably has a low refractive index and preferred examples of the inorganic filler include silica and magnesium fluoride with silica being more preferred.

The average particle size of the inorganic filler is preferably from 0.001 to 0.2 μm, more preferably from 0.001 to 0.05 μM. The filler is preferably uniform (mono-disperse) in the particle size.

The amount of the inorganic filler added is preferably from 5 to 70 mass %, more preferably from 10 to 50 mass %, still more preferably from 15 to 30 mass %, based on the entire mass of the low refractive index layer.

The inorganic filler is also preferably surface-treated before use. The surface treatment includes a physical surface treatment such as plasma discharge treatment and corona discharge treatment, and a chemical surface treatment using a coupling agent. A chemical surface treatment using a coupling agent is preferred. The coupling agent used is preferably an organoalkoxy metal compound (e.g., titanium coupling agent, silane coupling agent) including the compound of formula (1) which is described later. In the case where the inorganic filler is silica, a treatment with a silane coupling agent is particularly effective.

The compound of formula (1) may be used as a surface treating agent for the inorganic filler of the low refractive index layer so as to previously apply a surface treatment before the preparation of a coating solution for the layer or may be further added as an additive at the preparation of the coating solution for the layer and incorporated into the layer.

As for the solvent composition of the coating solution used for forming the antiglare hard coat layer and the low refractive index layer according to the present invention, a sole solvent may be used or a mixture of solvents may be used. In the case of a mixture, a solvent having a boiling point of 100° C. or less preferably occupies from 50 to 100%, more preferably from 80 to 100%, still more preferably from 90 to 100%. If a solvent having a boiling point of 100° C. or less is in a proportion of less than 50%, the drying proceeds at a very slow speed and this causes worsening of the coated surface state and unevenness in the coated layer thickness, as a result, the optical properties such as reflectance are deteriorated. In the present invention, this problem is overcome by using a coating solution which contains a solvent having a boiling point of 100° C. or less in a larger amount.

Examples of the solvent having a boiling point of 100° C. or less include hydrocarbons such as hexane (boiling point: 68.7° C.), heptane (98.4° C.), cyclohexane (80.7° C.) and benzene (80.1° C.), halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.), ethers such as diethyl ether (34.6° C.), diisopropyl ether (68.5° C.), dipropyl ether (90.5° C.) and tetrahydrofuran (66° C.), esters such as ethyl formate (54.2° C.), methyl acetate (57.8° C.), ethyl acetate (77.1° C.) and isopropyl acetate (89° C.), ketones such as acetone (56.1° C.) and 2-butanone (=methyl ethyl ketone, 79.6° C.), alcohols such as methanol (64.5° C.), ethanol (78.3° C.), 2-propanol (82.4° C.) and 1-propanol (97.2° C.), cyano compounds such as acetonitrile (81.6° C.) and propionitrile (97.4° C.), and carbon disulfide (46.2° C.). Among these, ketones and esters are preferred, and ketones are more preferred. Among ketones, 2-butanone is preferred.

Examples of the solvent having a boiling point of 100° C. or more include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (=MIBK, 115.9° C.), 1-butanol (117.7° C.), N,N-dimethylformamide (153° C.), N,N-dimethylacetamide (166° C.) and dimethylsulfoxide (189° C.). Among these, cyclohexanone and 2-methyl-4-pentanone are preferred.

The coating solutions for the antiglare hard coat layer and the coating solutions for the low refractive index layer can be prepared by diluting the components for the antiglare hard coat layer and the components for the low refractive index layer each with the solvent having the above-described composition. The coating solution is preferably adjusted to an appropriate concentration by taking account of the viscosity of the coating solution and the specific gravity of the construction material, however, the concentration of the coating solution is preferably from 0.1 to 20 mass %, more preferably from 1 to 10 mass %.

In view of scratch resistance, at least one layer of the antiglare hard coat layer and the low refractive index layer for use in the antiglare and antireflection film of the present invention preferably contains a compound represented by the following formula (1):

(R$^1$)m-Si(OR$^2$)n      Formula (1)

wherein R$^1$ represents a substituted or unsubstituted alkyl or aryl group, R$^2$ represents a substituted or unsubstituted alkyl or acyl group, m represents an integer of 0 to 3, n represents an integer of 1 to 4, and the total of m and n is 4.

The compound represented by formula (1) is described below.

In formula (1), R$^1$ represents a substituted or unsubstituted alkyl or aryl group. Examples of the alkyl group include methyl, ethyl, propyl, isopropyl, hexyl, tert-butyl, sec-butyl, hexyl, decyl and hexadecyl. The alkyl group is preferably an alkyl group having from 1 to 30 carbon atoms, more preferably from 1 to 16 carbon atoms, still more preferably from 1 to 6 carbon atoms. Examples of the aryl group include phenyl and naphthyl with the phenyl group being preferred.

The substituent is not particularly limited but preferred examples thereof include halogen (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an alkoxysilyl group (e.g., trimethoxysilyl, triethoxysilyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino).

Among these, more preferred are a hydroxyl group, a mercapto group, a carboxyl group, an epoxy group, an alkyl group, an alkoxysilyl group, an acyloxy group and an acylamino group, still more preferred are an epoxy group, a polymerizable acyloxy group (e.g., acryloyloxy, methacryloyloxy) and a polymerizable acylamino group (e.g., acrylamino, methacrylamino). These substituents each may be further substituted.

R$^2$ represents a substituted or unsubstituted alkyl or acyl group. The alkyl group, the acyl group and the substituent are the same as described above for R$^1$. R$^2$ is preferably an unsubstituted alkyl group or an unsubstituted acyl group, more preferably an unsubstituted alkyl group.

m represents an integer of 0 to 3, n represents an integer of 1 to 4, and the total of m and n is 4. When R$^1$ or R$^2$ is present in a plural number, the plurality of R$^1$s or R$^2$s may be the same or different. m is preferably 0, 1 or 2, more preferably 1.

Specific examples of the compound represented by formula (1) are set forth below, however, the present invention is not limited thereto.

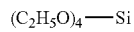 (1)

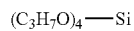 (2)

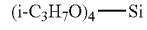 (3)

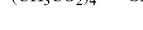 (4)

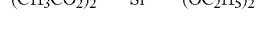 (5)

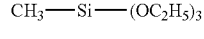 (6)

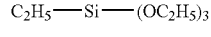 (7)

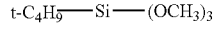 (8)

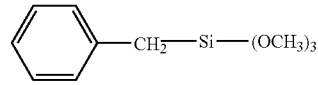 (9)

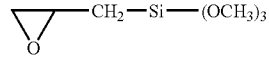 (10)

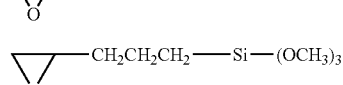 (11)

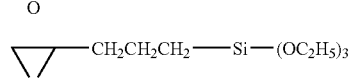 (12)

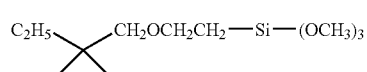 (13)

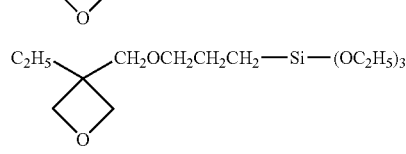 (14)

(15)

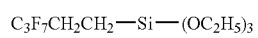 (16)

 (17)

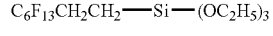 (18)

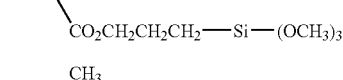 (19)

 (20)

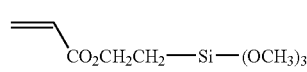 (21)

 (22)

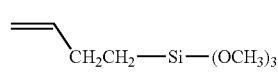 (23)

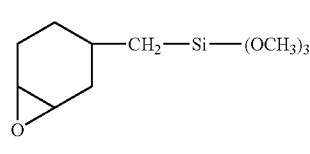 (24)

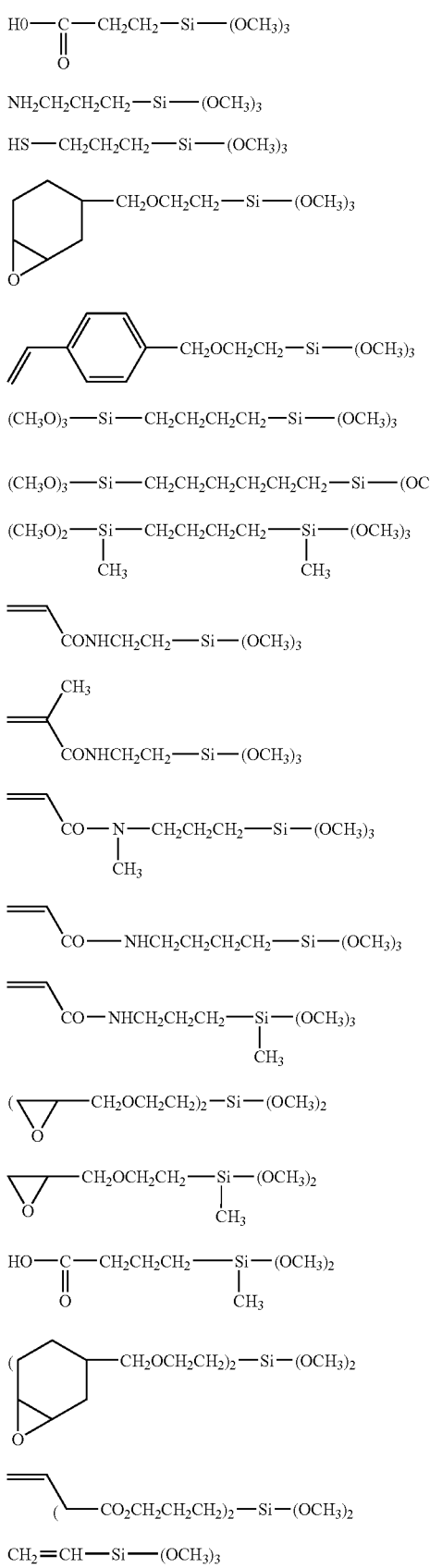
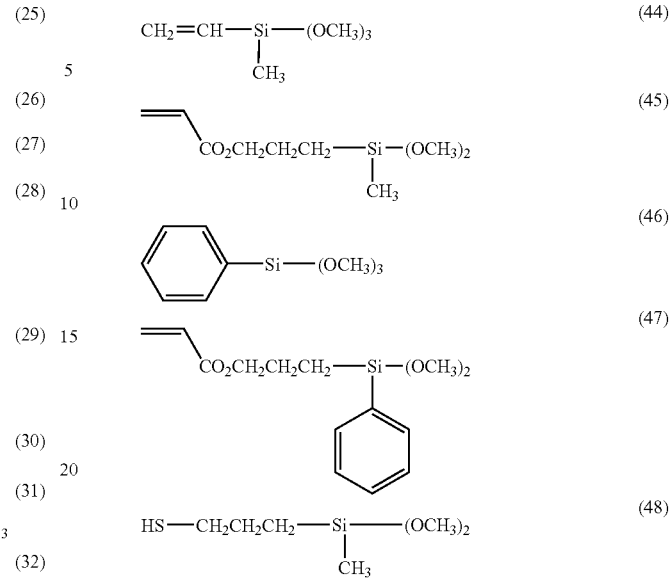

Among these specific examples, (1), (12), (18) and (19) are preferred.

The amount added of the compound of formula (1) is preferably from 1 to 300 mass %, more preferably from 3 to 200 mass %, most preferably from 5 to 100 mass %, based on the entire solid content in the layer containing the compound.

The compound represented by formula (1) is preferably added to the coating solution for the layer intended to contain the compound.

The transparent support of the antiglare and antireflection film of the present invention is preferably a plastic film. Examples of the polymer for forming the plastic film include cellulose esters (e.g., triacetyl cellulose, diacetyl cellulose; representative examples thereof include TAC-TD80U and TD80UF produced by Fuji Photo Film Co., Ltd.), polyamide, polycarbonate, polyesters (e.g., polyethylene terephthalate, polyethylene naphthalate), polystyrene, polyolefin, norbornene-base resin (ARTON, a trade name, produced by JSR) and amorphous polyolefin (ZEONEX, a trade name, produced by Nippon Zeon). Among these, preferred are triacetyl cellulose, polyethylene terephthalate and polyethylene naphthalate, and more preferred is triacetyl cellulose.

The triacetyl cellulose comprises a single layer or a plurality of layers. The single layer triacetyl cellulose is prepared by drum casting disclosed in JP-A-7-11055 or band casting and the triacetyl cellulose comprising a plurality of layers is prepared by a so-called co-casting method disclosed in JP-A-61-94725 and JP-B-62-43846 (the term "JP-B" as used herein means an "examined Japanese patent publication"). More specifically, a raw material flake is dissolved using a solvent such as halogenated hydrocarbons (e.g., dichloromethane), alcohols (e.g., methanol, ethanol, butanol), esters (e.g., methyl formate, methyl acetate) and ethers (e.g., dioxane, dioxolane, diethyl ether). If desired, various additives such as plasticizer, ultraviolet absorbent, deterioration inhibitor, lubricant and peeling accelerator are added thereto. The obtained solution (called "dope") is cast on a support comprising a horizontal endless metal belt or a rotating drum, by dope-supplying means (called "die"). At this time, in the case of a single layer, a single dope is solely cast and in the case of a plurality of layers, a high-concentration cellulose ester dope and low-concentration dopes in both sides thereof are co-cast. The dope is dried on the support to some extent, the film thus imparted with rigidity is peeled from the support, and the film is passed through a drying zone by various transportation means to remove the solvent.

A representative example of the solvent for dissolving the triacetyl cellulose is dichloromethane. However, in view of the global environment or working environment, the solvent preferably contains substantially no halogenated hydrocarbon such as dichloromethane. The term "contain substantially no halogenated hydrocarbon" as used herein means that the percentage of halogenated hydrocarbon in the organic solvent is less than 5 mass % (preferably less than 2 mass %). In the case of preparing a triacetyl cellulose dope using a solvent containing substantially no dichloromethane or the like, a special dissolution method described below must be used.

A first dissolution method called cooling dissolution method is described below. In a solvent, triacetyl cellulose is gradually added while stirring at a temperature in the vicinity of room temperature (−10 to 40° C.). Thereafter, the mixture is cooled to −100 to −10° C. (preferably from −80 to −10° C., more preferably from −50 to −20° C., most preferably from −50 to −30° C.). The cooling may be performed in a dry ice methanol bath (−75° C.) or in a cooled diethylene glycol solution (−30 to −20° C.). As a result of cooling, the mixture of triacetyl cellulose and solvent is solidified. This is then heated to 0 to 200° C. (preferably from 0 to 150° C., more preferably from 0 to 120° C., most preferably from 0 to 50° C.) to provide a solution where triacetyl cellulose flows in the solvent. The temperature may be elevated by allowing the solidified mixture to stand at room temperature or may be elevated in a warm bath.

A second method called high-temperature dissolution method is described below. In a solvent, triacetyl cellulose is gradually added while stirring at a temperature in the vicinity of room temperature (−10 to 40° C.). The triacetyl cellulose solution for use in the present invention is preferably swelled in advance by adding triacetyl cellulose to a mixed solvent containing various solvents. In this method, the triacetyl cellulose is preferably dissolved to a concentration of 30 mass % or less, however, in view of the drying efficiency at the film formation, the concentration is preferably higher. Thereafter, the mixed solution of organic solvents is heated to 70 to 240° C. (preferably from 80 to 220° C., more preferably from 100 to 200° C., most preferably from 100 to 190° C.) under a pressure of 0.2 to 30 MPa. This heated solution cannot be coated as it is and must be cooled to a temperature lower than the lowest boiling point of the solvents used. In this case, the solution is generally cooled to −10 to 50° C. and returned to an atmospheric pressure. The cooling may be performed only by allowing the high-pressure high-temperature container or line housing the triacetyl cellulose solution to stand at room temperature or preferably, the apparatus may be cooled using a cooling medium such as cooling water. The cellulose acetate film containing substantially no halogenated hydrocarbon such as dichloromethane and the production method thereof are described in *JIII Journal of Technical Disclosure* (No. 2001-1745, issued on Mar. 15, 2001, hereinafter simply referred to as "Kokai Giho 2001-1745").

In the case of using the antiglare and antireflection film of the present invention for a liquid display device, the antiglare and antireflection film is disposed on the outermost surface of a display by providing an adhesive layer on one surface. When the transparent support is triacetyl cellulose, since triacetyl cellulose is used as a protective film for protecting the polarizing layer of a polarizing plate, it is preferred in view of the cost to use the antiglare and antireflection film of the present invention for the protective film as it is.

The polarizing plate with an antiglare and antireflection film of the present invention can be obtained by forming an outermost layer mainly comprising a fluorine-containing polymer on a transparent support and then performing a saponification treatment. The saponification treatment is performed by a known method, for example, by dipping the film in an alkali solution for an appropriate time. After the dipping in an alkali solution, the film is preferably washed thoroughly with water or dipped in a dilute acid to neutralize the alkali component so that the alkali component cannot remain in the film.

By the saponification treatment, the surface of the transparent support in the side opposite the surface having an outermost layer is hydrophilized.

The hydrophilized surface is particularly effective for improving the adhesive property to a polarizing film mainly comprising polyvinyl alcohol. Furthermore, the hydrophilized surface is hardly attached with dusts in air and on bonding with a polarizing film, dusts scarcely intrude into the space between the polarizing film and the antiglare and antireflection film, whereby the dot defects due to dusts can be effectively prevented.

The saponification treatment is preferably performed such that the surface of the transparent support in the side opposite the surface having an outermost layer has a contact angle to water of 40° or less, preferably 30° or less, more preferably 20° or less.

The polarizing plate with an antiglare and antireflection film of the present invention uses the above-described antiglare and antireflection film for at least one sheet of two protective films of the polarizing layer. By using the antiglare and antireflection film of the present invention on the outermost surface, the polarizing plate obtained can be prevented from reflection of external light and favored with high refinement suitability, excellent antifouling property, high scratch resistance and the like. In the polarizing plate of the present invention, the antiglare and antireflection film serves also as a protective film, so that the production cost can be reduced.

In the case of using the antiglare and antireflection film of the present invention for one surface protective film of the polarizer, as described above, the surface of the transparent support in the side opposite the surface where the antireflection layer is formed must be saponified. The method for the alkali saponification treatment can be specifically selected from the following two methods:

(1) after the formation of an antireflection layer on a transparent support, the film is dipped at least once in an alkali solution, whereby the back surface of the film is saponified; and (2) before or after the formation of an antireflective layer on a transparent support, an alkali solution is coated on the surface in the side opposite the surface where the antiglare and antireflection film is formed, and then the film is heated and washed with water and/or neutralized, whereby only the back surface of the film is saponified. The method (1) is advantageous in that the treatment can be performed by the same step as that for the general-purpose triacetyl cellulose film, however, since the antiglare and antireflection film surface is also saponified, the surface may be alkali hydrolyzed to deteriorate the film or the components in the solution for the saponification treatment may be dried and remain to cause staining. If the case is so, the method (2) is advantageous, though a specific step for the treatment is necessary.

The antiglare and antireflection film of the present invention can be formed by the following method, however, the present invention is not limited to this method.

Coating solutions containing components for forming respective layers are prepared. The coating solution for forming an antiglare hard coat layer is coated on a transparent support by a reverse gravure method (this method is classified into a gravure coating method, a microgravure coating method and the like), a dip coating method, an air knife coating method, a curtain coating method, a roller coating method, a wire bar coating method or an extrusion coating method (see, U.S. Pat. No. 2,681,294), and then heated and dried. Among these coating methods, a microgravure coating method is preferred. The formed coating is irradiated with light or heated to polymerize the monomer for forming the antiglare hard coat layer and cure the polymer, whereby an antiglare hard coat layer is formed.

If desired, before the coating of the antiglare hard coat layer, a smooth had coat layer may be coated and cured in the same manner.

Thereafter, the coating solution for forming a low refractive index layer is coated on the antiglare hard coat layer in the same manner and irradiated with light or heated to form a low refractive index layer. In this way, the antiglare and antireflection film of the present invention is obtained.

The microgravure coating method for use in the coating of respective layers of the antiglare and antireflection film of the present invention is a coating method characterized in that a gravure roll having a diameter of about 10 to 100 mm, preferably from about 20 to 50 mm, and having a gravure pattern stamped on the entire circumference is rotated under the support in the direction reverse to the transportation direction of the support and at the same time, an extra coating solution is scraped off from the surface of the gravure roll by a doctor blade, whereby a constant amount of the coating solution is transferred to and coated on the lower surface of the support while leaving the upper surface of the support in a free state. A roll-form transparent support is continuously unrolled and on one surface of the unrolled support, at least one layer of the antiglare hard coat layer and the low refractive index layer containing a fluorine-containing polymer can be coated by the microgravure coating method.

With respect to the conditions for the coating by the microgravure coating method, the number of lines in the gravure pattern stamped on the gravure roll is preferably from 50 to 800 lines/inch, more preferably from 100 to 300 lines/inch, the depth of the gravure pattern is preferably from 1 to 600 μm, more preferably from 5 to 200 μm, the rotation number of the gravure roll is preferably from 3 to 800 rpm, more preferably from 5 to 200 rpm, and the support transportation speed is preferably from 0.5 to 100 m/min, more preferably from 1 to 50 m/min.

The haze value of the thus-formed antiglare and antireflection film of the present invention is from 10 to 70%, preferably from 30 to 50%, and the average reflectance at 450 to 650 nm is 2.2% or less, preferably 1.9% or less.

The antiglare and antireflection film of the present invention has a haze value and an average reflectance each in the above-described range, whereby good antiglare and antireflection property can be obtained without deteriorating the transmitted image.

The antiglare and antireflection film of the present invention can be applied to display devices such as liquid crystal display device (LCD), plasma display panel (PDP), electroluminescence display (ELD) and cathode ray tube display device (CRT). Since the antiglare and antireflection film of the present invention has a transparent support, this film is used by adhering the transparent support side to the image display surface of an image display device.

Also, the antiglare and antireflection film of the present invention is preferably used by combining it with a polarizing plate comprising a polarizer, a transparent support, and an optical compensation film composed of an optically anisotropic layer formed by fixing the orientation of discotic liquid crystal, or a light-scattering layer. The polarizing plate is more preferably a polarizing plate where the film other than the antireflection film out of two protective films of a polarizer is an optical compensation film having an optical compensation layer comprising an optically anisotropic layer, the optically anisotropic layer is a layer having a negative birefringence and comprising a compound having a discotic structural unit, the disc plane of the discotic structural unit is inclined with respect to the surface protective film plane, and the angle made by the disc plane of the discotic structural unit and the surface protective film plane is changed in the depth direction of the optically anisotropic layer. The polarizing plate comprising a light-scattering layer is described, for example, in JP-A-11-305010. In the case of use as one sheet of the surface protective films of a polarizer, the antiglare and antireflection film of the present invention can be preferably used for a transmissive, reflective or transflective liquid crystal in a mode such as twisted nematic (TN) mode, super twisted nematic (STN) mode, vertical alignment (VA) mode, in-plane switching (IPS) mode and optically compensated bend cell (OCB) mode. Particularly, in the case of a TN-mode or IPS-mode liquid crystal display device, when an optical compensation film having an effect of enlarging the view angle is used for, out of front and back two protective films of the polarizer, the protective film on the surface opposite the antireflection film of the present invention as described in JP-A-2001-100043, a polarizing plate having an antireflection effect and a view angle enlarging effect with a thickness of one polarizing plate can be obtained and therefore, this is preferred.

For the polarizing film, any polarizing film can be used and examples thereof include an iodine-type polarizing film, a dye-type polarizing film using a dichromatic dye, and a polyene-type polarizing film. The iodine-type polarizing film and the dye-type polarizing film can be generally produced by using a polyvinyl alcohol-base film.

Figure 2:
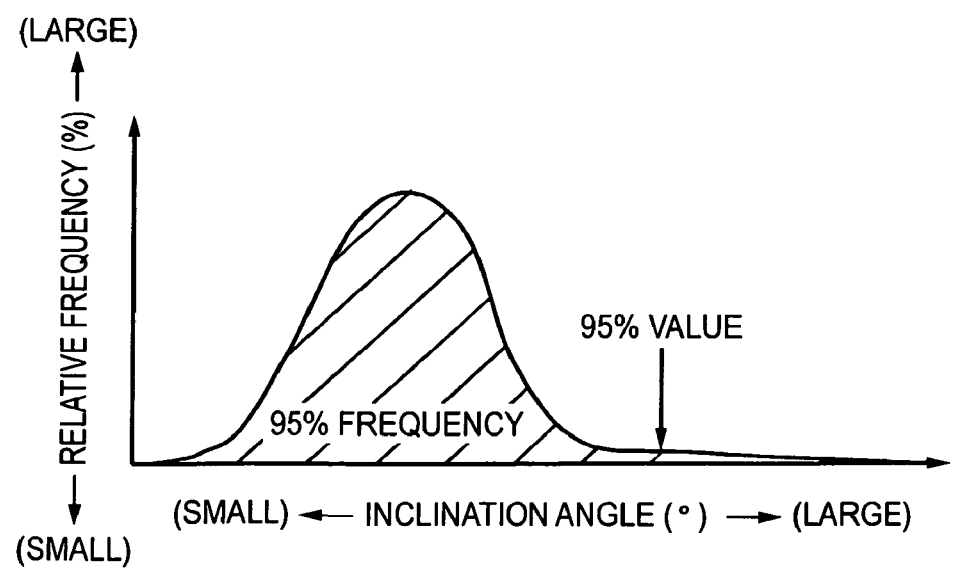
FIG. 2 is a schematic view for explaining the meaning of the 95% value of scattering angle distribution.

For example, a polarizing film obtained by the following method may be used. A polyvinyl alcohol-base film is continuously fed and stretched by applying a tension while holding both edges of the film with holding means, such that the trajectory L1 of the holding means from the substantial holding start point until the substantial holding release point at one edge of the film and the trajectory L2 of the holding means from the substantial holding start point until the substantial holding release point at another edge of the polymer film have a relationship of the following formula (2) with the distance W between two substantial holding release points, the straight line connecting left and right substantial holding start points is almost orthogonal to the center line of the film introduced into the holding step, and the straight line connecting left and right substantial holding release points is almost orthogonal to the center line of the film delivered to the next step (see, FIG. 2; see, U.S. Patent Publication No. 2002-8840A1):

$$|L2-L1|>0.4W \qquad \text{Formula (2)}$$

Also, in the case of a transmissive or transflective liquid crystal display device, when a commercially available brightness increasing film (a polarization separation film having a polarization selective layer, for example, D-BEF produced by Sumitomo 3M) is used in combination, a display device having higher visibility can be obtained. Furthermore, when combined with a λ/4 plate, this can be used as a polarizing plate for reflection-type liquid crystal or as a surface protective plate for organic EL display to reduce the reflected light from the surface and the inside. In addition, when the antireflection layer of the present invention is formed on a transparent support such as PET and PEN, this can be used for an image display device such as plasma display panel (PDP) and cathode ray tube display device (CRT).

The present invention is described in greater detail below by referring to Examples, however, the present invention should not be construed as being limited thereto.

EXAMPLES

Example 1

Example Sample 1

(Preparation of Coating Solution (1) for Antiglare Hard Coat Layer)

61.3 Parts by mass of a commercially available silica (fine particulate silica, average particle size: about 15 nm)-containing UV curable hard coat solution (DESOLITE KZ7317, produced by JSR, solid concentration: about 72%, $SiO_2$ content in solid contents: about 38%, containing a polymerizable monomer DPHA and a polymerization initiator) was diluted with 8.4 parts by mass of methyl isobutyl ketone. The coating film obtained by coating and uv-curing this solution had a refractive index of 1.51.

To this solution, 11.0 parts by mass of a dispersion solution obtained by dispersing a 25% methyl isobutyl ketone dispersion solution of crosslinked polystyrene particles having an average particle size of 3.5 μm (SX-350H, a trade name, produced by Soken Kagaku K.K., refractive index: 1.61) in a polytron dispersing machine at 10,000 rpm for 30 minutes was added. Then, 14.4 parts by mass of a dispersion solution obtained by dispersing a 25% methyl isobutyl ketone dispersion solution of crosslinked polystyrene particles having an average particle size of 5 μm (SX-500H, a trade name, produced by Soken Kagaku K.K., refractive index: 1.61) in a polytron dispersing machine at 10,000 rpm for 30 minutes was added. Furthermore, 4.9 parts by mass of 3-acryloxypropyltrimethoxysilane (KBM-5103, produced by Shin-Etsu Chemical Co., Ltd.) was added.

The resulting mixed solution was filtered through a polypropylene-made filter having a pore size of 30 μm to prepare Coating Solution (1) for antiglare hard coat layer.

(Preparation of Coating Solution A for Low Refractive Index Layer)

To 55.2 parts by mass of a heat-crosslinkable fluorine-containing polymer having a refractive index of 1.42 (JN-7228, solid concentration: 6%, produced by JSR), 4.8 parts by mass of colloidal silica dispersion solution (MEK-ST, average particle size: 10 to 20 nm, solid concentration: 30%, produced by Nissan Chemical), 28.0 parts by mass of methyl ethyl ketone, 2.8 parts by mass of cyclohexanone and 9.2 parts by mass of 3-acryloxypropylmethoxysilane (KBM-5103, produced by Shin-Etsu Chemical Co., Ltd.) were added and stirred. The resulting solution was filtered through a polypropylene-made filter having a pore size of 1 μm to prepare Coating Solution A for low refractive index layer.

Coating Solution (1) for antiglare hard coat layer and Coating Solution A for low refractive index layer each was coated as follows.

(1) Formation of Antiglare Hard Coat Layer

A 80 μm-thick triacetyl cellulose film (TAC-TD80UL, produced by Fuji Photo Film Co., Ltd.) in a roll form was unrolled and thereon, Coating Solution (1) for antiglare hard coat layer prepared above was coated using a doctor blade and a microgravure roll having a diameter of 50 mm and having a gravure pattern with 110 lines/inch and a depth of 35 μm, at a gravure roll rotation number of 40 rpm and a transportation speed of 10 m/min and then dried at 120° C. for 2 minutes. Thereafter, an ultraviolet ray was irradiated thereon at an illuminance of 400 $mW/cm^2$ and a dose of 300 $mJ/cm^2$ using an air cooled metal halide lamp of 240 W/cm (manufactured by I-Graphics K.K.) under nitrogen purging to an oxygen concentration of 0.1% or less to cure the coating layer and thereby form an antiglare hard coat layer having a dry thickness of 4.3 μm. Then, the film was taken up. The refractive index of the antiglare hard coat layer was 1.51.

(2) Formation of Low Refractive Index Layer

The film having coated thereon the antiglare hard coat layer was again unrolled and thereon Coating Solution A for low refractive index layer prepared above was coated using a doctor blade and a microgravure roll having a diameter of 50 mm and having a gravure pattern with 200 lines/inch and a depth of 35 μm, at a gravure roll rotation number of 40 rpm and a transportation speed of 10 m/min and then dried at 80° C. for 2 minutes. Thereafter, an ultraviolet ray was irradiated thereon at an illuminance of 400 $mW/cm^2$ and a dose of 300 $mJ/cm^2$ using an air cooled metal halide lamp of 240 W/cm (manufactured by I-Graphics K.K.) under nitrogen purging to an oxygen concentration of 0.1% or less. Subsequently, the coating layer was thermally crosslinked at 140° C. for 8 minutes to form a low refractive index layer having a thickness of 0.096 μm. Then, the film was taken up. The refractive index of the low refractive index layer was 1.43 (completion of the antiglare and antireflection film of Example Sample 1).

TABLE 1

| | Antiglare Hard Coat Layer | | | | | | |
|---|---|---|---|---|---|---|---|
| | | First Particle | | Second Particle | | | |
| Sample No. | Thickness (μm) | Particle Size (μm) | Ratio to Layer Thickness (%) | Particle Size (μm) | Ratio to Layer Thickness (%) | Antiglare Property | Good Black without cloudiness |
| Example Sample 1 | 4.3 | 5.0 | 116 | 3.5 | 81 | ○ | ○○○ |
| Comparative Example Sample 1 | 4.3 | 5.0 | 116 | 4.3 | 100 | ○ | X |

TABLE 1-continued

| | Antiglare Hard Coat Layer | | | | | | |
| | | First Particle | | Second Particle | | | |
| Sample No. | Thickness (μm) | Particle Size (μm) | Ratio to Layer Thickness (%) | Particle Size (μm) | Ratio to Layer Thickness (%) | Antiglare Property | Good Black without cloudiness |
| --- | --- | --- | --- | --- | --- | --- | --- |
| Comparative Example Sample 2 | 4.3 | 5.0 | 116 | 4.1 | 95 | ○ | X |
| Example Sample 2 | 4.3 | 5.0 | 116 | 4.0 | 93 | ○ | ○○○ |
| Example Sample 3 | 4.3 | 5.0 | 116 | 3.9 | 91 | ○ | ○○○ |
| Example Sample 4 | 4.3 | 5.0 | 116 | 3.6 | 84 | ○ | ○○○ |
| Example Sample 5 | 4.3 | 5.0 | 116 | 3.4 | 79 | ○ | ○○ |
| Example Sample 6 | 4.3 | 5.0 | 116 | 3.2 | 74 | ○ | ○○ |
| Example Sample 7 | 4.3 | 5.0 | 116 | 3.0 | 70 | ○ | ○○ |
| Example Sample 8 | 4.3 | 5.0 | 116 | 2.9 | 68 | ○ | ○ |
| Example Sample 9 | 4.3 | 5.0 | 116 | 2.7 | 63 | ○ | ○ |
| Example Sample 10 | 4.3 | 5.0 | 116 | 2.6 | 60 | ○ | ○ |
| Comparative Example Sample 3 | 4.3 | 5.0 | 116 | 2.5 | 58 | ○ | X |
| Comparative Example Sample 4 | 4.3 | 5.0 | 116 | 2.3 | 53 | ○ | X |
| Comparative Example Sample 5 | 4.3 | 5.0 | 116 | — | — | ○ | X |
| Comparative Example Sample 6 | 4.3 | 4.3 | 100 | — | — | X | no antiglare property (undecidable) |
| Comparative Example Sample 7 | 4.3 | 4.3 | 100 | 3.5 | 81 | X | no antiglare property (undecidable) |
| Comparative Example Sample 8 | 4.3 | 4.4 | 102 | 3.5 | 81 | X | no antiglare property (undecidable) |
| Example Sample 11 | 4.3 | 4.5 | 105 | 3.5 | 81 | ○ | ○○○ |
| Example Sample 12 | 4.3 | 4.7 | 109 | 3.5 | 81 | ○ | ○○○ |
| Example Sample 13 | 4.3 | 5.1 | 119 | 3.5 | 81 | ○ | ○○○ |
| Example Sample 14 | 4.3 | 5.2 | 121 | 3.5 | 81 | ○ | ○○ |
| Example Sample 15 | 4.3 | 5.4 | 126 | 3.5 | 81 | ○ | ○○ |
| Example Sample 16 | 4.3 | 5.5 | 128 | 3.5 | 81 | ○ | ○○ |
| Example Sample 17 | 4.3 | 5.6 | 130 | 3.5 | 81 | ○ | ○ |
| Example Sample 18 | 4.3 | 5.8 | 135 | 3.5 | 81 | ○ | ○ |
| Example Sample 19 | 4.3 | 5.95 | 138 | 3.5 | 81 | ○ | ○ |
| Comparative Example Sample 9 | 4.3 | 6.00 | 140 | 3.5 | 81 | ○ | X |
| Comparative Example Sample 10 | 4.3 | 6.1 | 142 | 3.5 | 81 | ○ | X |
| Comparative Example Sample 11 | 4.3 | 7.0 | 163 | 3.5 | 81 | ○ | X |

TABLE 1-continued

| | | Antiglare Hard Coat Layer | | | | | |
| | | First Particle | | Second Particle | | | |
| Sample No. | Thickness (μm) | Particle Size (μm) | Ratio to Layer Thickness (%) | Particle Size (μm) | Ratio to Layer Thickness (%) | Antiglare Property | Good Black without cloudiness |
|---|---|---|---|---|---|---|---|
| Comparative Example Sample 12 | 3.5 | 4.0 | 114 | 3.4 | 97 | ○ | X |
| Example Sample 20 | 3.5 | 4.0 | 114 | 3.3 | 94 | ○ | ○○○ |
| Example Sample 21 | 3.5 | 4.0 | 114 | 3.0 | 86 | ○ | ○○○ |
| Example Sample 22 | 3.5 | 4.0 | 114 | 2.8 | 80 | ○ | ○○○ |
| Example Sample 23 | 3.5 | 4.0 | 114 | 2.6 | 74 | ○ | ○○ |
| Example Sample 24 | 3.5 | 4.0 | 114 | 2.5 | 71 | ○ | ○○ |
| Example Sample 25 | 3.5 | 4.0 | 114 | 2.4 | 69 | ○ | ○ |
| Example Sample 26 | 3.5 | 4.0 | 114 | 2.2 | 63 | ○ | ○ |
| Example Sample 27 | 3.5 | 4.0 | 114 | 2.1 | 60 | ○ | ○ |
| Comparative Example Sample 13 | 3.5 | 4.0 | 114 | 1.9 | 54 | ○ | X |
| Comparative Example Sample 14 | 3.5 | 4.0 | 114 | 1.8 | 51 | ○ | X |
| Example Sample 28 | 3.5 | 4.3 | 123 | 3.0 | 86 | ○ | ○○ |
| Example Sample 29 | 3.5 | 4.6 | 131 | 3.0 | 86 | ○ | ○ |
| Example Sample 30 | 3.5 | 4.8 | 137 | 3.0 | 86 | ○ | ○ |
| Comparative Example Sample 14 | 3.5 | 5.0 | 143 | 3.0 | 86 | ○ | X |
| Comparative Example Sample 16 | 3.5 | 5.5 | 157 | 3.0 | 86 | ○ | X |
| Comparative Example Sample 17 | 3.5 | 3.5 | 100 | — | — | X | no antiglare property (undecidable) |
| Comparative Example Sample 18 | 3.5 | 4.0 | 114 | — | — | ○ | X |

(Saponification Treatment of Antiglare and Antireflection Film)

Example Sample 1 was subjected to the following treatment.

An aqueous 1.5 N sodium hydroxide solution was prepared and kept at a temperature of 50° C. Furthermore, an aqueous 0.01 N dilute sulfuric acid solution was prepared. The obtained antiglare and antireflection film was dipped in the aqueous sodium hydroxide solution prepared above for 2 minutes and then dipped in water to thoroughly wash out the aqueous sodium hydroxide solution. Subsequently, the film was dipped in the aqueous dilute sulfuric acid solution prepared above for 1 minute and then dipped in water to thoroughly wash out the aqueous dilute sulfuric acid solution. Thereafter, the antiglare and antireflection film was thoroughly dried at a temperature of 100° C.

In this way, a saponified antiglare and anti-reflection film was produced. By this treatment, TAC on the back surface of the antiglare and antireflection film of Example Sample 1 was hydrophilized.

(Preparation and Actual Mounting of Polarizing Plate with Antiglare and Antireflection Film)

Using the saponified Example Sample 1, an antiglare and antireflection polarizing plate was produced.

Separately, the antiglare and antireflection film on the outer surface of a commercially available high refinement note-type PC (15-inch UXGA Note PC, manufactured by DELL) was completely peeled off together with the adhesive layer. Then, the polarizing plate produced above was actually mounted thereon by attaching it through an adhesive layer newly imparted to the saponified back surface TAC, such that the antiglare and antireflection layer came to the outer surface.

(Evaluation of Antiglare and Antireflection Film)

The film obtained was evaluated on the following items.

(1) Evaluation of Antiglare Property

The produced antiglare and antireflection film was actually mounted on 15-inch UXGA Note PC manufactured by DELL. Thereon, an uncovered fluorescent lamp (8,000 cd/m$^2$) without a louver was reflected and the shading degree of the reflected image of the fluorescent lamp was evaluated with an eye according to the following criteria:

◯: The contour of fluorescent lamp was not recognized (sufficiently high antiglare property).

Δ: The fluorescent lamp was not clear but the contour could be recognized.

X: The fluorescent lamp was almost clearly recognized (insufficient antiglare property).

(2) Inclination Angle of Surface Protrusion

The produced antiglare and antireflection film was measured on the inclination angle of surface protrusion using "Micromap" manufactured by Ryoka System K.K. The sampling area for the measurement was 800 μm×800 μm. In the "surface protrusion inclination angle distribution" of Table 1, the angle at a frequency of 95% as integrated from the small angle side in the inclination angle distribution is shown (see, FIG. 2).

(3) Average Distance Between Protrusions

The produced antiglare and antireflection film was measured on the average distance (Sm) between surface protrusions using Surfcorder Model 3E-3F manufactured by Kosaka Kenkyusho K.K.

(4) Non-Loosening of Black

The produced antiglare and antireflection film was actually mounted on 15-inch UXGA Note PC manufactured by DELL. The black display was presented and the good black without cloudiness was decided with an eye by sensory evaluation.

◯-◯◯◯◯◯: Black is not loosened (a larger number of ◯ is better).

Δ: Black is slightly loosened.

X: Black is loosened.

(5) Rough Feeling

The produced antiglare and antireflection film was actually mounted on 15-inch UXGA Note PC manufactured by DELL. The power source was turned OFF and the rough feeling on the surface was decided with an eye by sensory evaluation.

◯-◯◯◯: Good with no rough feeling (a larger number of ◯ is better).

X: Rough.

Example Samples and Comparative Example Samples

Regarding each of antiglare and antireflection films produced in accordance with Example Sample 1, the thickness of the antiglare layer, the particle size of each of the particle for imparting antiglare property (first particle) and the particle for imparting internal scattering property (second particle, the ratio (%) of the particle size of each particle to the thickness of the antiglare layer, and evaluations results on the antiglare property and good black without cloudiness are shown in Table 1. The samples produced thoroughly in the same manner as Example Sample 1 except that the thickness of the antiglare layer, the particle size and amount used of the particle for imparting antiglare property, and the particle size and amount used of the particle for imparting internal scattering property were adjusted according to Example Sample 1, were designated as Example Samples 2 to 30 and Comparative Examples Samples 1 to 18.

Each saponified film of Example Samples 2 to 30 and Comparative Example Samples 1 to 18 was attached with a polarizing plate to produce a polarizing plate with an antiglare and antireflection film. Using this polarizing plate, a liquid crystal display device where the antiglare and antireflection layer was disposed as the outermost layer was produced. As a result, in the case of Example Samples 1 to 30, excellent contrast was revealed due to no reflection of external light, black at the black display was not loosened and a liquid crystal display device having high visibility and good appearance was obtained. On the other hand, in the case of Comparative Example Samples 1 to 18, it is seen that when the particle of imparting antiglare property (first particle) exceeds 140% or the particle of imparting internal scattering property (second particle) is less than 60%, when the particle size of the particle for imparting antiglare property or particle for imparting internal scattering property is from 95% to less than 105% of the layer thickness, or when only one kind of light-transmissive particle is used in the antiglare hard coat layer, a desired surface shape cannot be obtained and the good black without cloudiness is abruptly impaired. It is also seen that in view of good black without cloudiness, the particle size of the particle for imparting antiglare property, which is larger than the thickness of the antiglare layer, must be from 105% to less than 140%, preferably from 105% to less than 130%, more preferably from 105% to less than 120%, and the particle size of the particle for imparting internal scattering property, which is smaller than the thickness of the antiglare layer, must be from 60% to less than 95%, preferably from 70% to less than 95%, more preferably from 80% to less than 95%. By satisfying these, an excellent display device can be realized.

Furthermore, samples were produced thoroughly in the same manner as Example Sample 1 except that in Examples Sample 1, without changing the thickness of the antiglare layer and the particle sizes of the particle for imparting antiglare property and the particle for imparting internal scattering property, only the amount used of the particle for imparting antiglare property and the amount used of the particle for imparting internal scattering property were adjusted to have a surface inclination angle and an average distance between protrusions shown in Table 2. These samples were designated as Example Samples 31 to 47.

TABLE 2

| Example Sample No. | Antiglare Hard Coat Layer Thickness (μm) | First Particle Particle Size (μm) | First Particle Ratio to Layer Thickness (%) | Second Particle Particle Size (μm) | Second Particle Ratio to Layer Thickness (%) | Surface Inclination Angle Distribution (° 95% value) | Average Distance between Protrusions (μm) | Antiglare Property | Good Black without cloudiness | Rough Feeling |
|---|---|---|---|---|---|---|---|---|---|---|
| 31 | 4.3 | 5.0 | 116 | 3.5 | 81 | 17 | 50 | ○ | ○○○ | ○○○ |
| 32 | 4.3 | 5.0 | 116 | 3.5 | 81 | 14 | 50 | ○ | ○○○○ | ○○○ |
| 33 | 4.3 | 5.0 | 116 | 3.5 | 81 | 12 | 50 | ○ | ○○○○○ | ○○○ |
| 34 | 4.3 | 5.0 | 116 | 3.5 | 81 | 19 | 50 | ○ | ○○○ | ○○○ |
| 35 | 4.3 | 5.0 | 116 | 3.5 | 81 | 20 | 50 | ○ | ○○ | ○○○ |
| 36 | 4.3 | 5.0 | 116 | 3.5 | 81 | 21 | 50 | ○ | ○○ | ○○○ |
| 37 | 4.3 | 5.0 | 116 | 3.5 | 81 | 25 | 50 | ○ | ○○ | ○○○ |
| 38 | 4.3 | 5.0 | 116 | 3.5 | 81 | 17 | 25 | ○ | ○ | ○○○ |
| 39 | 4.3 | 5.0 | 116 | 3.5 | 81 | 17 | 30 | ○ | ○○ | ○○○ |
| 40 | 4.3 | 5.0 | 116 | 3.5 | 81 | 17 | 38 | ○ | ○○ | ○○○ |
| 41 | 4.3 | 5.0 | 116 | 3.5 | 81 | 17 | 40 | ○ | ○○○ | ○○○ |
| 42 | 4.3 | 5.0 | 116 | 3.5 | 81 | 17 | 58 | ○ | ○○○ | ○○○ |
| 43 | 4.3 | 5.0 | 116 | 3.5 | 81 | 17 | 60 | ○ | ○○○ | ○○ |
| 44 | 4.3 | 5.0 | 116 | 3.5 | 81 | 17 | 65 | ○ | ○○○ | ○○ |
| 45 | 4.3 | 5.0 | 116 | 3.5 | 81 | 17 | 68 | ○ | ○○○ | ○○ |
| 46 | 4.3 | 5.0 | 116 | 3.5 | 81 | 17 | 70 | ○ | ○○○ | ○ |
| 47 | 4.3 | 5.0 | 116 | 3.5 | 81 | 17 | 75 | ○ | ○○○ | ○ |

As seen from the results in Table 2, when the 95% value of the surface inclination angle distribution is less than 20°, preferably less than 15°, more preferably less than 13°, further good good black without cloudiness can be realized, and when the average distance Sm between protrusions is from 30 μm to less than 70 μm, more preferably from 40 μm to less than 60 μm, a display device having further good good black without cloudiness and free of rough feeling can be realized.

Example Sample 1A

Figure 3:
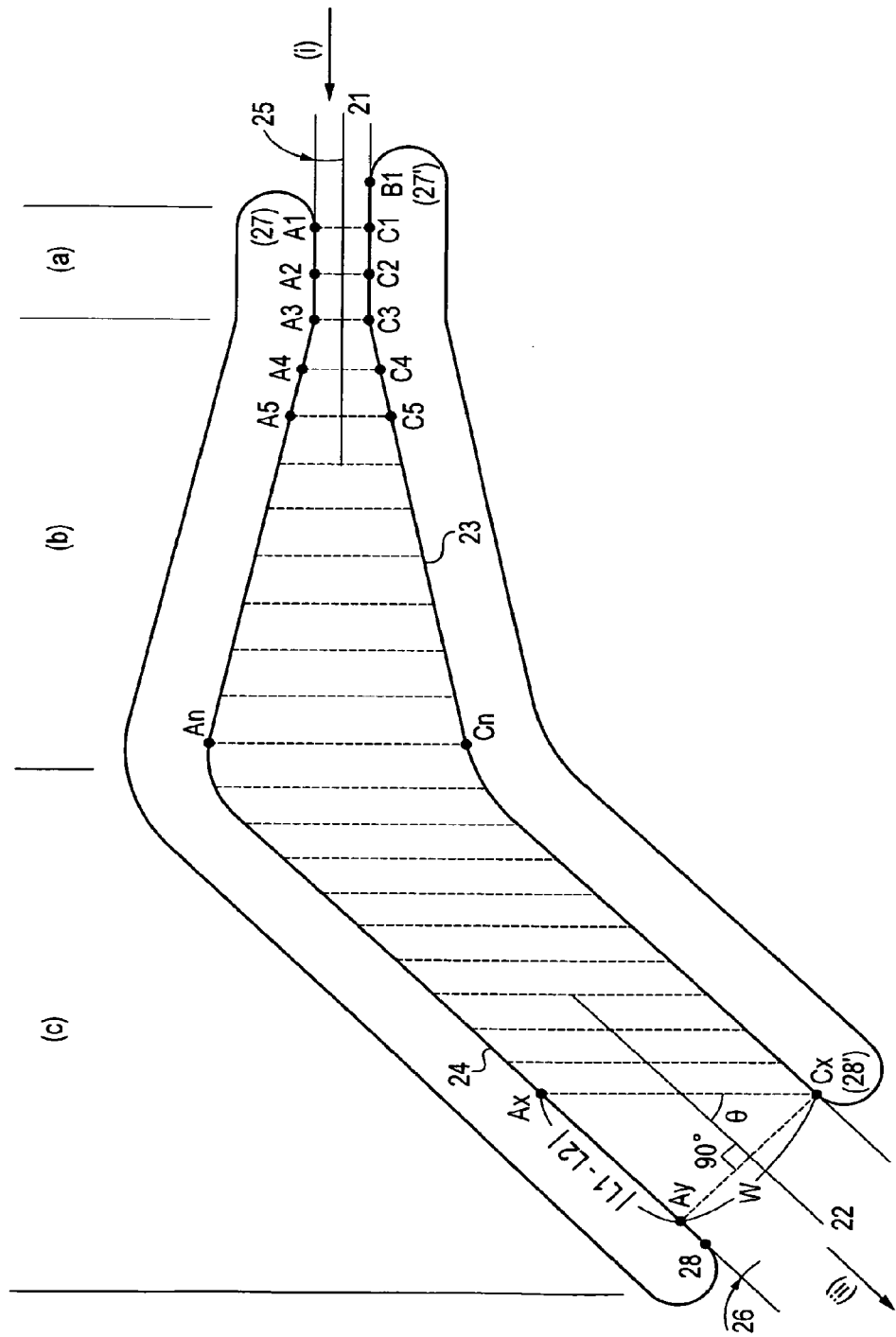
FIG. 3 is a schematic view of a tenter stretching machine used in Examples.

A polarizing film was produced by the following method.
A PVA film was dipped in an aqueous solution containing 2.0 g/liter of iodine and 4.0 g/liter of potassium iodide at 25° C. for 240 seconds and further dipped in an aqueous solution containing 10 g/liter of boric acid at 25° C. for 60 seconds. Subsequently, the film was introduced into a tenter stretching machine in the form of FIG. 3 and stretched to 5.3 times. Then, the tenter was bent as shown in FIG. 3 with respect to the stretching direction and thereafter, the width was kept constant. The film was dried in an atmosphere at 80° C. and removed from the tenter. The difference in the conveyance speed between right and left tenter clips was less than 0.05% and the angle made by the center line of film introduced and the center line of film delivered to the next step was 46°. Here, |L1−L2| was 0.7 m, W was 0.7 m and a relationship of |L1−L2|=W was established. The substantial stretching direction Ax-Cx at the tenter outlet was inclined at 45° with respect to the center line 22 of film delivered to the next step. At the outlet of the tenter, wrinkling and deformation of film were not observed.

Figure 4:
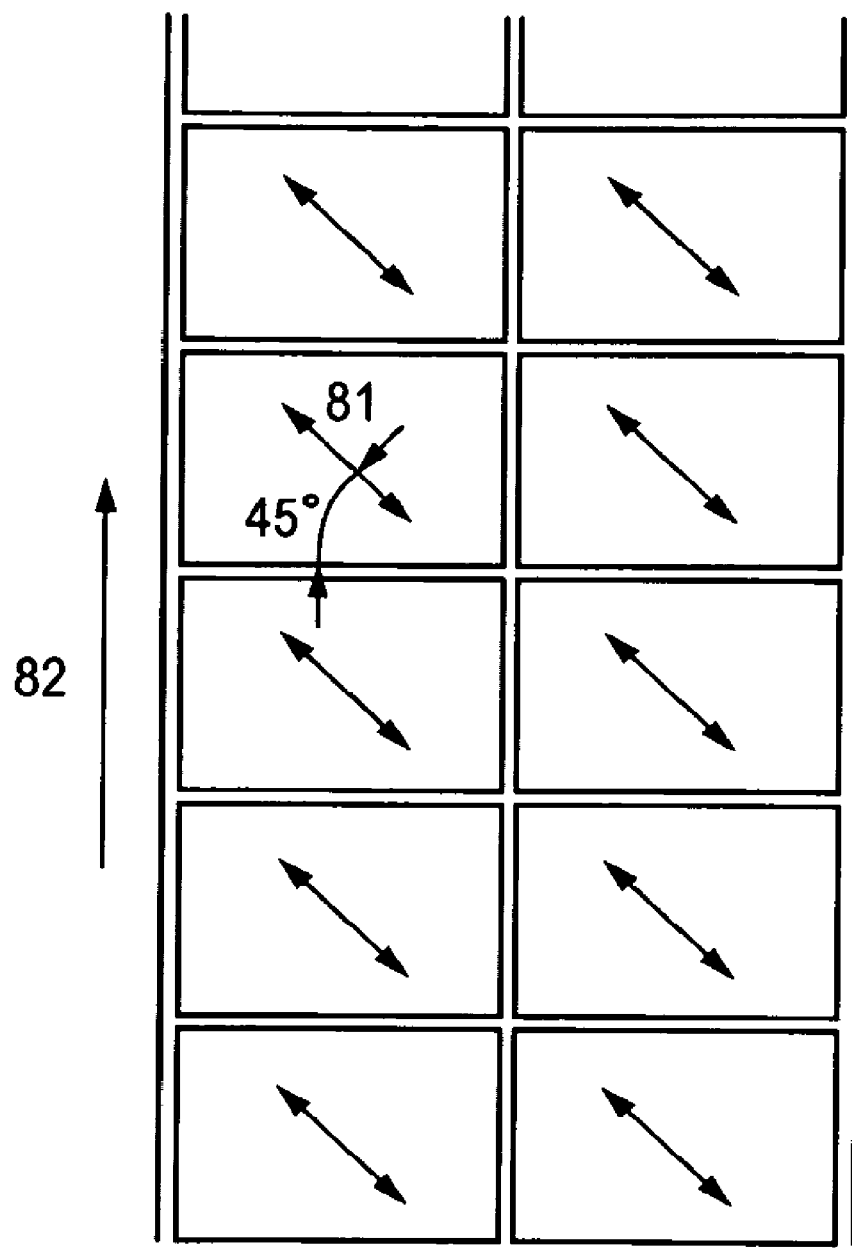
FIG. 4 is a schematic view showing the cutting of a polarizing plate used in Examples.

The film was attached with saponified Fujitac (cellulose triacetate, retardation value: 3.0 nm) produced by Fuji Photo Film Co., Ltd. using a 3% aqueous solution of PVA (PVA-117H produced by Kuraray Co., Ltd.) as the adhesive and the combined films were heated at 80° C. to obtain a polarizing film having an effective width of 650 mm. The absorption axis direction of the obtained polarizing plate was inclined at 45° with respect to the longitudinal direction. The transmittance of this polarizing plate at 550 nm was 43.7% and the polarization degree was 99.97%. Furthermore, the polarizing plate was cut into a size of 310×233 mm as in FIG. 4, as a result, a polarizing plate having an absorption axis inclined at 45° with respect to the side could be obtained with an area efficiency of 91.5%.

Subsequently, the saponified film of Example Sample 1 was attached with this polarizing plate to produce a polarizing plate with an antiglare and antireflection film. Using this polarizing plate, a liquid crystal display device where the antiglare and antireflection layer was disposed as the outermost layer was produced. As a result, excellent contrast was revealed due to no reflection of external light and despite a high image quality-type high refinement liquid crystal display having microsize picture elements, glaring and blurring of letters did not occur, black was not loosened, and a display device having high visibility and good appearance was obtained.

Example Sample 1B

A polarizing plate with an antiglare and antireflection film was produced by attaching the saponified film of Example Sample 1 in place of "Fujitac (cellulose triacetate, retardation value: 3.0 nm) produced by Fuji Photo Film Co., Ltd." in the production of the polarizing plate having an absorption axis inclined at 45° of Example Sample 1A. Using this polarizing plate, a liquid display device where the antiglare and antireflection layer was disposed as the outermost layer was produced. As a result, similarly to Example Sample 1, excellent contrast was revealed due to no reflection of external light and despite a high image quality-type high refinement liquid crystal display having microsize picture elements, glaring and blurring of letters did not occur, black was not loosened, and a display device having high visibility and good appearance was obtained.

Example Sample 1C

Example Sample 1 was dipped in a 1.5 N aqueous NaOH solution at 55° C. for 2 minutes, then neutralized and washed with water to saponify the triacetyl cellulose surface on the back surface of the film. This film was attached as a protective film to both surfaces of a polarizer produced by adsorbing iodine to a 80 μm-thick triacetyl cellulose film (TAC-TD80U, produced by Fuji Photo Film Co., Ltd.) saponified under the same conditions and stretching the film, to produce a polarizing plate. The obtained polarizing plate was exchanged with the polarizing plate in the viewing side of the liquid crystal display device (having D-BEF produced by Sumitomo 3M, which is a polarization separation film having a polarization selective layer, between the backlight and the liquid crystal cell) of a note-type personal computer with a transmissive TN liquid crystal display device. As a result, excellent contrast was revealed due to no reflection of external light and despite a high image quality-type high refinement liquid crystal display having microsize picture elements, glaring and blurring of letters did not occur, black was not loosened, visibility and appearance were excellent, and reflection of background was extremely reduced. Thus, a liquid crystal display device having a very high display quality was obtained.

Example Sample 1D

A view angle enlarging film (Wide View Film SA-12B, produced by Fuji Photo Film Co., Ltd.) having an optical compensation layer where the disc plane of the discotic structural unit is inclined with respect to the transparent support plane and the angle made by the disc plane of the discotic structural unit and the transparent support plane is changed in the depth direction of the optically anisotropic layer, was used for the protective film in the liquid crystal cell side of the polarizing plate attached with Example Sample 1 and disposed in the viewing side of a transmissive TN liquid crystal cell and for the protective film in the liquid crystal cell side of the polarizing plate disposed in the backlight side. As a result, the contrast in a bright room was excellent and despite a high image quality-type high refinement liquid crystal display having microsize picture elements, glaring and blurring of letters did not occur, black was not loosened, visibility and appearance were excellent, and the view angle in the vertical and horizontal directions was very wide. Thus, a liquid crystal display device having a very high display quality was obtained.

Example Sample 1E

Example Sample 1 was attached to the glass plate on the surface of an organic EL display device through a pressure-sensitive adhesive, as a result, the reflection on the glass surface was suppressed and a display device having very high visibility and good appearance was obtained.

Example 1F

Using Example Sample 1, a polarizing plate with an antireflection film on one surface was produced and a λ/4 plate was attached to the surface opposite the surface having the antireflection film of the polarizing plate. This polarizing plate was attached to the glass plate on the surface of an organic EL display device, as a result, the surface reflection and the reflection from the inside of the surface glass were cut and a display device having very high visibility and good appearance was obtained.

Example 2

Coating Solution (1) for antiglare hard coat layer prepared above and Coating Solution A for low refractive index layer prepared above each was coated as follows. The combination of layers laminated is as shown in Table 3.

(1) Formation of Antiglare Hard Coat Layer

A 80 μm-thick triacetyl cellulose film (TAC-TD80UL, produced by Fuji Photo Film Co., Ltd.) in a roll form was unrolled and thereon, Coating Solution (1) for antiglare hard coat layer prepared above was coated using a doctor blade and a microgravure roll having a diameter of 50 mm and having a gravure pattern with 110 lines/inch and a depth of 35 μm, at a gravure roll rotation number of 40 rpm and a transportation speed of 10 m/min and then dried at 120° C. for 2 minutes. Thereafter, an ultraviolet ray was irradiated thereon at an illuminance of 400 mW/cm$^2$ and a dose of 300 mJ/cm$^2$ using an air cooled metal halide lamp of 240 W/cm (manufactured by I-Graphics K.K.) under nitrogen purging to an oxygen concentration of 0.1% or less to cure the coating layer and thereby form an antiglare hard coat layer having a dry thickness of 4.3 μm. Then, the film was taken up. The refractive index of the antiglare hard coat layer was 1.51.

(2) Formation of Low Refractive Index Layer

The film having coated thereon the antiglare hard coat layer was again unrolled and thereon Coating Solution A for low refractive index layer prepared above was coated using a doctor blade and a microgravure roll having a diameter of 50 mm and having a gravure pattern with 200 lines/inch and a depth of 35 μm, at a gravure roll rotation number of 40 rpm and a transportation speed of 10 m/min and then dried at 80° C. for 2 minutes. Thereafter, an ultraviolet ray was irradiated thereon at an illuminance of 400 mW/cm$^2$ and a dose of 300 mJ/cm$^2$ using an air cooled metal halide lamp of 240 W/cm (manufactured by I-Graphics K.K.) under nitrogen purging to an oxygen concentration of 0.1% or less. Subsequently, the coating layer was thermally crosslinked at 140° C. for 8 minutes to form a low refractive index layer having a thickness of 0.096 μm. Then, the film was taken up. The refractive index of the low refractive index layer was 1.43 (completion of the antiglare and antireflection film of Example Sample 48).

TABLE 3

| | Formulation of Antiglare Hard Coat | | | | | | |
|---|---|---|---|---|---|---|---|
| | | Refractive | Particle of Imparting Antiglare Property | | | Particle of Imparting Internal Scattering Property | |
| Example Sample No. | Formulation of Coating Solution | Index of Antiglare Layer | Particle Size (μm) | Species of Construction Material | Refractive Index | Particle Size (μm) | Species of Construction Material | Refractive Index |
| 48 | Antiglare Hard Coat Solution (1) | 1.51 | 5.0 | crosslinked polystyrene | 1.61 | 3.5 | crosslinked polystyrene | 1.61 |
| 49 | ↑ | 1.51 | 5.0 | ↑ | ↑ | 3.5 | ↑ | ↑ |
| 50 | ↑ | 1.51 | 5.0 | ↑ | ↑ | 3.5 | ↑ | ↑ |
| 51 | ↑ | 1.51 | 5.0 | ↑ | ↑ | 3.5 | ↑ | ↑ |
| 52 | ↑ | 1.51 | 5.0 | ↑ | ↑ | 3.5 | ↑ | ↑ |
| 53 | ↑ | 1.51 | 5.0 | ↑ | ↑ | 3.5 | ↑ | ↑ |

TABLE 3-continued

| | | | Formulation of Antiglare Hard Coat | | | | | |
|---|---|---|---|---|---|---|---|---|
| | | Refractive | | Particle of Imparting Antiglare Property | | | Particle of Imparting Internal Scattering Property | |
| Example Sample No. | Formulation of Coating Solution | Index of Antiglare Layer | Particle Size (μm) | Species of Construction Material | Refractive Index | Particle Size (μm) | Species of Construction Material | Refractive Index |
| 54 | ↑ | 1.51 | 5.0 | ↑ | ↑ | 3.5 | ↑ | ↑ |
| 55 | Only fine particle silica was removed. | 1.53 | 5.0 | ↑ | ↑ | 3.5 | ↑ | ↑ |
| 56 | Only fine particle silica was removed. | 1.53 | 5.0 | ↑ | ↑ | 3.5 | ↑ | ↑ |
| 57 | Only fine particle silica was removed. | 1.53 | 5.0 | ↑ | ↑ | 3.5 | ↑ | ↑ |
| 58 | Only fine particle silica was removed. | 1.53 | 5.0 | ↑ | ↑ | 3.5 | ↑ | ↑ |
| 59 | Only fine particle silica was removed. | 1.53 | 5.0 | ↑ | ↑ | 3.0 | ↑ | ↑ |
| 60 | Refractive index was adjusted by changing fine particle silica to fine particle zirconia. | 1.56 | 5.0 | ↑ | ↑ | 3.5 | ↑ | ↑ |
| 61 | Crosslinked polystyrene particle in Antiglare Hard Coat Solution (1) was changed to crosslinked benzoguanamine particle. | 1.51 | 5.0 | crosslinked benzoguanamine | 1.68 | 3.5 | Crosslinked benzoguanamine | 1.68 |
| 62 | ↑ | 1.51 | 3.5 | ↑ | ↑ | 2.0 | ↑ | ↑ |

TABLE 4

| Example Sample No. | Antiglare Property | $I_{5°}/I_{0°}$ (%) | $I_{20°}/I_{0°}$ (%) | Glaring | Blurring of Letters | Remarks |
|---|---|---|---|---|---|---|
| 48 | ○ | 4.0 | 0.06 | ○○ | ○○○ | — |
| 49 | ○ | 3.5 | 0.06 | ○ | ○○○ | — |
| 50 | ○ | 4.5 | 0.08 | ○○ | ○○ | — |
| 51 | ○ | 5.0 | 0.09 | ○○ | ○ | — |
| 52 | ○ | 6.0 | 0.10 | ○○ | ○ | — |
| 53 | ○ | 10.0 | 0.10 | ○○ | ○ | Front brightness was allowable lower limit. |
| 54 | ○ | 12.0 | 0.10 | ○○ | ○ | Front brightness was N.G. |
| 55 | ○ | 4.2 | 0.07 | ○○ | ○○ | — |
| 56 | ○ | 4.3 | 0.09 | ○○ | ○ | — |
| 57 | ○ | 4.1 | 0.08 | ○○ | ○○ | — |
| 58 | ○ | 3.5 | 0.05 | ○ | ○○○ | — |
| 59 | ○ | 4.6 | 0.10 | ○○ | ○ | — |
| 60 | ○ | 3.6 | 0.10 | ○ | ○ | — |
| 61 | ○ | 4.0 | 0.10 | ○○ | ○ | As compared with Example Sample 48, the blurring of letters was in a lower level. |
| 62 | ○ | 3.8 | 0.10 | ○ | ○ | As compared with Example Sample 48, the blurring of letters was in a lower level. |

(Saponification Treatment of Antiglare and Antireflection Film)

Example Sample 48 was subjected to the following treatment.

An aqueous 1.5 N sodium hydroxide solution was prepared and kept at a temperature of 50° C. Furthermore, an aqueous 0.01 N dilute sulfuric acid solution was prepared. The obtained antiglare and antireflection film was dipped in the aqueous sodium hydroxide solution prepared above for 2 minutes and then dipped in water to thoroughly wash out the aqueous sodium hydroxide solution. Subsequently, the film was dipped in the aqueous dilute sulfuric acid solution prepared above for 1 minute and then dipped in water to thoroughly wash out the aqueous dilute sulfuric acid solution. Thereafter, the antiglare and antireflection film was thoroughly dried at a temperature of 100° C. In this way, a saponified antiglare and anti-reflection film was produced.

By this treatment, TAC on the back surface of the antiglare and antireflection film of Example Sample 48 was hydrophilized.

(Preparation and Actual Mounting of Polarizing Plate with Antiglare and Antireflection Film)

Using the saponified Example Sample 48, an antiglare and antireflection polarizing plate was produced.

Separately, the antiglare and antireflection film on the outer surface of a commercially available high refinement note-type PC (15-inch UXGA Note PC, manufactured by DELL) was completely peeled off together with the adhesive layer. Then, the polarizing plate produced above was actually mounted thereon by attaching it through an adhesive layer newly imparted to the saponified back surface TAC, such that the antiglare and antireflection layer came to the outer surface.

(Evaluation of Antiglare and Antireflection Film)

The film obtained was evaluated on the following items.

(1) Evaluation of Antiglare Property

The produced antiglare and antireflection film was actually mounted on 15-inch UXGA Note PC manufactured by DELL. Thereon, an uncovered fluorescent lamp (8,000 cd/m$^2$) without a louver was reflected and the shading degree of the reflected image of the fluorescent lamp was evaluated with an eye according to the following criteria:

◯: The contour of fluorescent lamp was not recognized (sufficiently high antiglare property).

Δ: The fluorescent lamp was not clear but the contour could be recognized.

X: The fluorescent lamp was almost clearly recognized (insufficient antiglare property).

(2) Evaluation of Glaring

The produced antiglare and antireflection film was actually mounted on 15-inch UXGA Note PC manufactured by DELL and the degree of glaring (dispersion in brightness due to the lens effect of surface protrusions of the antiglare and antireflection film) was evaluated with an eye according to the following criteria:

◯◯: Completely no glaring.
◯: Almost no glaring.
X: Slight glaring.
XX: Uncomfortable glaring.

(3) Evaluation of Blurring of Letters

The produced antiglare and antireflection film was actually mounted on 15-inch UXGA Note PC manufactured by DELL and the degree of blurring of letters was evaluated according to the following criteria:

◯◯◯: Completely no blurring of letters.
◯◯: Almost no blurring of letters.
◯: Letters were slightly blurred but no problem.
X: Letters were blurred.
XX: Letters were blurred and visibility was clearly poor.

(4) Scattering Angle Distribution

Figure 5:
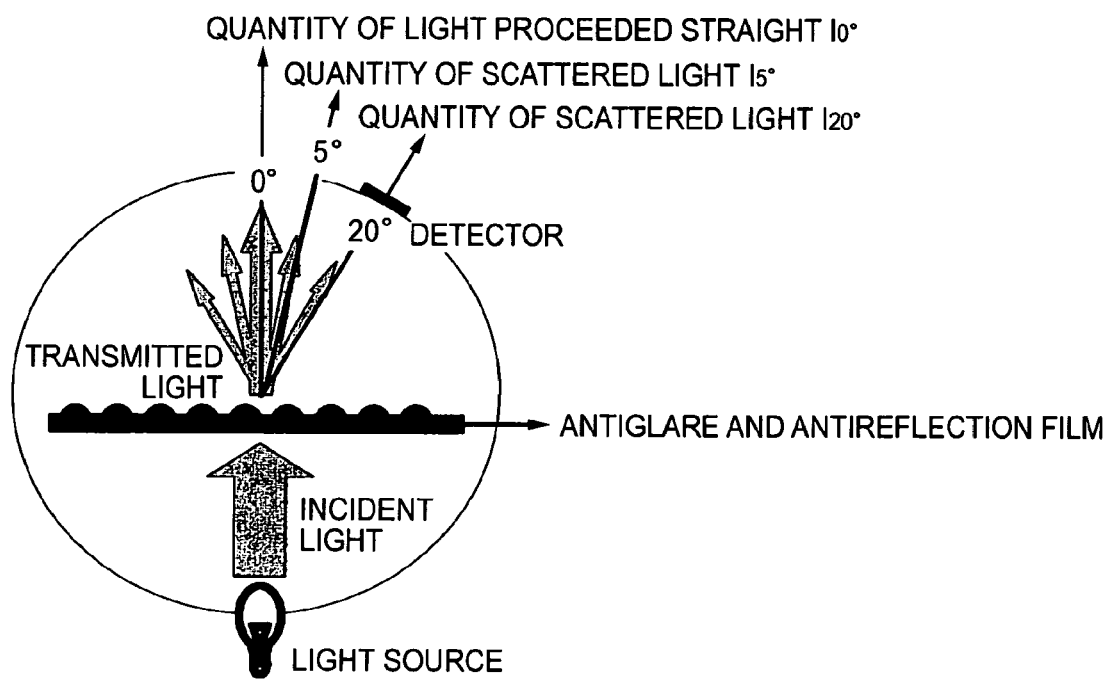
FIG. 5 is a conceptual view for the measurement of the quantities of scattered light, $I_0°$, $I_5°$ and $I_{20}°$.

In the positional relationship shown in FIG. 5, the produced antiglare and antireflection film was measured on the scattered angle distribution of transmitted light. The measurement was performed using a device "Goniophotometer" manufactured by Murakami Shikizai Kenkyusho.

Example Samples and Comparative Example Samples

Samples were prepared thoroughly in the same manner as Example Sample 48 except that in Example Sample 48, the construction material species (refractive index), particle size and amount used of each of the particle for imparting antiglare property and the particle for imparting internal scattering property, the kind and amount used of the inorganic filler in the antiglare hard coat layer, and the $I_5°/I_0°$ and $I_{20}°/I_0°$ djusted using the thickness of antiglare hard coat layer as the control factor were changed as shown in Tables 3 and 4. These samples were designated as Example Samples 49 to 62.

Each saponified film of Example Samples 48 to 62 was attached to a polarizing plate to produce a polarizing plate with an antiglare and antireflection film. Using this polarizing plate, a liquid crystal display device where the antiglare and antireflection layer was disposed as the outermost layer was produced. As a result, in Example Samples 48 to 62, excellent contrast was revealed due to no reflection of external light and despite a high image quality-type high refinement liquid crystal display having microsize picture elements, glaring and blurring of letters did not occur and a display device having high visibility was obtained.

As seen from Tables 3 and 4, the $I_5°/I_0$ is preferably 3.5% or more, more preferably 4% or more, and on the other hand, in order not to reduce the front brightness, the upper limit is 10% or less, preferably 6% or less. The $I_{20}°/I_0°$ois preferably 0.15% or less, more preferably 0.10% or less, still more preferably 0.08% or less, particularly preferably 0.06% or less. Furthermore, when the difference between the refractive index of the antiglare hard coat layer and the refractive index of the particle for imparting antiglare property or the particle for imparting internal scattering property exceeds 0.15, the blurring of letters is liable to change for the worse in obtaining the same glaring improvement effect and therefore, this is not preferred (compare Example Sample 48 with Example Sample 61).

Example Sample 48A

A PVA film was dipped in an aqueous solution containing 2.0 g/liter of iodine and 4.0 g/liter of potassium iodide at 25° C. for 240 seconds and further dipped in an aqueous solution containing 10 g/liter of boric acid at 25° C. for 60 seconds. Subsequently, the film was introduced into a tenter stretching machine in the form of FIG. 3 and stretched to 5.3 times. Then, the tenter was bent as shown in FIG. 3 with respect to the stretching direction and thereafter, the width was kept constant. The film was dried in an atmosphere at 80° C. and removed from the tenter. The difference in the conveyance speed between right and left tenter clips was less than 0.05% and the angle made by the center line of film introduced and the center line of film delivered to the next step was 46°. Here, |L1-L2| was 0.7 m, W was 0.7 m and a relationship of |L1-L2|=W was established. The substantial stretching direction Ax-Cx at the tenter outlet was inclined at 45° with respect to the center line 22 of film delivered to the next step. At the outlet of the tenter, wrinkling and deformation of film were not observed.

The film was attached with saponified Fujitac (cellulose triacetate, retardation value: 3.0 nm) produced by Fuji Photo Film Co., Ltd. using a 3% aqueous solution of PVA (PVA-117H produced by Kuraray Co., Ltd.) as the adhesive and the combined films were heated at 80° C. to obtain a polarizing film having an effective width of 650 mm. The absorption axis direction of the obtained polarizing plate was inclined at 45° with respect to the longitudinal direction. The transmittance of this polarizing plate at 550 nm was 43.7% and the polarization degree was 99.97%. Furthermore, the polarizing plate was cut into a size of 310×233 mm as in FIG. 4, as a result, a polarizing plate having an absorption axis inclined at 45° with respect to the side could be obtained with an area efficiency of 91.5%.

Subsequently, the saponified film of Example Sample 48 was attached with this polarizing plate to produce a polarizing plate with an antiglare and antireflection film. Using this polarizing plate, a liquid crystal display device where the antiglare and antireflection layer was disposed on the outermost surface was produced. As a result, excellent contrast was revealed due to no reflection of external light and despite a high image quality-type high refinement liquid crystal display having microsize picture elements, glaring and blurring of letters did not occur and a display device having high visibility was obtained.

Example Sample 48B

A polarizing plate with an antiglare and antireflection film was produced by attaching the saponified film of Example Sample 48 in place of "Fujitac (cellulose triacetate, retardation value: 3.0 nm) produced by Fuji Photo Film Co., Ltd." in the production of the polarizing plate having an absorption axis inclined at 45° of Example Sample 48A. Using this polarizing plate, a liquid display device where the antiglare and antireflection layer was disposed as the outermost layer was produced. As a result, similarly to Example Sample 48, excellent contrast was revealed due to no reflection of external light and despite a high image quality-type high refinement liquid crystal display having microsize picture elements, glaring and blurring of letters did not occur and a display device having high visibility was obtained.

Example Sample 48C

Example Sample 48 was dipped in a 1.5 N aqueous NaOH solution at 55° C. for 2 minutes, then neutralized and washed with water to saponify the triacetyl cellulose surface on the back surface of the film. This film was attached as a protective film to both surfaces of a polarizing film produced by adsorbing iodine to a 80 μm-thick triacetyl cellulose film (TAC-TD80U, produced by Fuji Photo Film Co., Ltd.) saponified under the same conditions and stretching the film, to produce a polarizing plate. The obtained polarizing plate was exchanged with the polarizing plate in the viewing side of the liquid crystal display device (having D-BEF produced by Sumitomo 3M, which is a polarization separation film having a polarization selective layer, between the backlight and the liquid crystal cell) of a note-type personal computer with a transmissive TN liquid crystal display device. As a result, excellent contrast was revealed due to no reflection of external light and despite a high image quality-type high refinement liquid crystal display having microsize picture elements, glaring and blurring of letters did not occur and a display device having excellent visibility was obtained.

Example Sample 48D

A view angle enlarging film (Wide View Film SA-12B, produced by Fuji Photo Film Co., Ltd.) having an optical compensation layer where the disc plane of the discotic structural unit is inclined with respect to the transparent support plane and the angle made by the disc plane of the discotic structural unit and the transparent support plane is changed in the depth direction of the optically anisotropic layer, was used for the protective film in the liquid crystal cell side of the polarizing plate attached with Example Sample 48 and disposed in the viewing side of a transmissive TN liquid crystal cell and for the protective film in the liquid crystal cell side of the polarizing plate disposed in the backlight side. As a result, the contrast in a bright room was excellent and despite a high image quality-type high refinement liquid crystal display having microsize picture elements, glaring and blurring of letters did not occur, visibility was excellent, and the view angle in the vertical and horizontal directions was very wide. Thus, a liquid crystal display device having a very high display quality was obtained.

Example Sample 48E

Example Sample 48 was attached to the glass plate on the surface of an organic EL display device through a pressure-sensitive adhesive, as a result, the reflection on the glass surface was suppressed and a display device having very high visibility was obtained.

Example 48F

Using Example Sample 48, a polarizing plate with an antireflection film on one surface was produced and a λ/4 plate was attached to the surface opposite the surface having the antireflection film of the polarizing plate. This polarizing plate was attached to the glass plate on the surface of an organic EL display device, as a result, the surface reflection and the reflection from the inside of the surface glass were cut and a display device having very high visibility was obtained.

INDUSTRIAL APPLICABILITY

An antiglare and antireflection film of the present invention has a sufficiently high antireflection performance and at the same time, has excellent image display quality.

The invention claimed is:

1. An antiglare and antireflection film comprising a transparent support and at least one antiglare hard coat layer, wherein the at least one antiglare hard coat layer comprises:
   first light-transmissive particles having an average particle size of 60% to less than 95% based on the thickness of said antiglare hard coat layer, wherein the first light-transmissive particles consist of particles having a particle size smaller than the thickness of the antiglare hard coat layer; and
   second light-transmissive particles having an average particle size of 105% to less than 140% based on the thickness of said antiglare hard coat layer, wherein the second light-transmissive particles consist of particles having a particle size greater than the thickness of the antiglare hard coat layer,
   wherein when light enters from the transparent support side, the ratio between the quantity ($I_5°$) of light scattered to the direction inclined at 5° in the transmitted light and the quantity ($I_0°$) of light proceeded straight in the transmitted light is 3.5% or more, and the ratio between the quantity ($I_{20}°$) of light scattered to the direction inclined at 20° in the transmitted light and the quantity ($I_0°$) of light proceeded straight in the transmitted light is 0.1% or less.

2. The antiglare and antireflection film as described in claim 1, wherein the first light-transmissive particle has an average particle size of 70% to less than 95% based on the thickness of the antiglare hard coat layer, and the second light-transmissive particle has an average particle size of 105% to less than 130% based on the thickness of the antiglare hard coat layer.

3. The antiglare and antireflection film as described in claim 1, wherein the first light-transmissive particle has an average particle size of 80% to less than 95% based on the thickness of the antiglare hard coat layer, and the second light-transmissive particle has an average particle size of 105% to less than 120% based on the thickness of the antiglare hard coat layer.

4. The antiglare and antireflection film as described in claim 1, wherein the at least one antiglare hard coat layer has a thickness of 3 μm to less than 6 μm.

5. The antiglare and antireflection film as described in claim 1, wherein the at least one antiglare hard coat layer has a thickness of 4 μm to less than 5 μm.

6. The antiglare and antireflection film as described in claim 1, wherein the refractive index of the at least one antiglare hard coat layer and the refractive index of at least one light-transmissive particle in the antiglare hard coat layer are different in the range from 0.05 to 0.15.

7. The antiglare and antireflection film as described in claim 1, wherein in the surface protrusion shape of the antiglare and antireflection film, the average distance (Sm) between protrusions is from 30 μm to less than 70 μm.

8. The antiglare and antireflection film as described in claim 1, which further comprises a low refractive index layer on the antiglare hard coat layer.

9. A polarizing plate which comprises a polarizer having two protective films, wherein one of the two protective films of the polarizer includes the antiglare and antireflection film described in claim 1.

10. A display device comprising the polarizing plate described in claim 9 on the outermost surface of the display.

11. A display device comprising the antiglare and antireflection film described in claim 1 on the outermost surface of the display.

12. The antiglare and antireflection film as described in claim 1, wherein the first and second light-transmissive particles are present in the antiglare hard coat layer in an amount of from 100 to 1000 mg/m$^2$.

13. The antiglare and antireflection film as described in claim 12, wherein the first and second light-transmissive particles are present in the antiglare hard coat layer in an amount of from 300 to 800 mg/m$^2$.

14. The antiglare and antireflection film as described in claim 1, wherein the first light-transmissive particles have an average particle size of 70% to less than 95% based on the thickness of said antiglare hard coat layer.

15. An antiglare and antireflection film comprising a transparent support and at least one antiglare hard coat layer, wherein the at least one antiglare hard coat layer comprises:

a first light-transmissive particle having an average particle size of 60% to less than 95% based on the thickness of said antiglare hard coat layer; and a second light-transmissive particle having an average particle size of 105% to less than 140% based on the thickness of said antiglare hard coat layer, wherein when light enters from the transparent support side, the ratio between the quantity ($I_5°$) of light scattered to the direction inclined at 5° in the transmitted light and the quantity ($I_0°$) of light proceeded straight in the transmitted light is 3.5% or more, and the ratio between the quantity ($I_{20}°$) of light scattered to the direction inclined at 20° in the transmitted light and the quantity ($I_0°$) of light proceeded straight in the transmitted light is 0.1% or less.

16. A polarizing plate which comprises a polarizer having two protective films, wherein one of the two protective films of the polarizer includes the antiglare and antireflection film described in claim 15.

17. A display device comprising the polarizing plate described in claim 16 on the outermost surface of the display.

18. A display device comprising the antiglare and antireflection film described in claim 15 on the outermost surface of the display.

* * * * *